United States Patent
Birkestrand

(10) Patent No.: US 12,258,934 B2
(45) Date of Patent: Mar. 25, 2025

(54) OPEN AND CLOSED CYCLE LIFT FORCE TURBINES

(71) Applicant: Orville J. Birkestrand, Davenport, IA (US)

(72) Inventor: Orville J. Birkestrand, Davenport, IA (US)

( * ) Notice: Subject to any disclaimer, the term of this patent is extended or adjusted under 35 U.S.C. 154(b) by 0 days.

(21) Appl. No.: 18/241,724

(22) Filed: Sep. 1, 2023

(65) Prior Publication Data

US 2024/0035436 A1 Feb. 1, 2024

Related U.S. Application Data

(63) Continuation-in-part of application No. 17/186,739, filed on Feb. 26, 2021, now Pat. No. 11,781,521.

(Continued)

(51) Int. Cl.
*F03D 1/06* (2006.01)
*F03D 1/04* (2006.01)
*F03D 9/25* (2016.01)

(52) U.S. Cl.
CPC .............. *F03D 1/0641* (2013.01); *F03D 1/04* (2013.01); *F03D 9/25* (2016.05); *F05B 2240/13* (2013.01); *F05B 2240/301* (2013.01)

(58) Field of Classification Search
CPC ........ F01D 5/021; F01D 13/006; F01D 13/02; F03B 3/04; F03D 1/02
See application file for complete search history.

(56) References Cited

U.S. PATENT DOCUMENTS

| | | |
|---|---|---|
| 4,108,403 A | 8/1978 | Finch |
| 4,143,522 A | 3/1979 | Hamrick et al. |

(Continued)

FOREIGN PATENT DOCUMENTS

| | | |
|---|---|---|
| EP | 2 006 537 A2 | 12/2008 |
| JP | S-58109502 U | 7/1983 |

(Continued)

OTHER PUBLICATIONS

"Notification of Transmittal of the International Search Report and the Written Opinion of the International Searching Authority, or the Declaration," International Filing Date: Feb. 26, 2021, International Application No. PCT/US2021/019925, Applicant: Birkestrand, Orville J., Date of Mailing: Jun. 9, 2021, pp. 1-15.

*Primary Examiner* — Brian O Peters
(74) *Attorney, Agent, or Firm* — Cesari and McKenna, LLP

(57) ABSTRACT

Open and closed cycle lift force turbines are provided. Illustratively, the open cycle lift force turbine operates in an open cycle environment without heat and/or pressure, utilizing asymmetric pressure distribution on lift turbine blades mainly to generate thrust with the normal component of this lift force, while using the tangential component of this lift force to drive a bypass fan providing additional thrust and to drive accessories, provide control to the fluid velocity, and/or provide motivation of the fluid's flow. The open cycle lift force turbine may be utilized to generate continuous thrust, heat and/or electricity for powering vehicles in any atmosphere. The closed cycle lift force turbine may be utilized to generate continuous thrust, heat and/or electricity for powering vehicles at any speed in any atmosphere or lack thereof.

24 Claims, 25 Drawing Sheets

Related U.S. Application Data

(60) Provisional application No. 62/982,421, filed on Feb. 27, 2020.

(56) References Cited

U.S. PATENT DOCUMENTS

| | | |
|---|---|---|
| 4,537,146 A | 8/1985 | Wainwright |
| 5,140,170 A | 8/1992 | Henderson |
| 5,241,815 A * | 9/1993 | Lee .................... F02C 3/14 60/39.43 |
| 5,570,859 A | 11/1996 | Quandt |
| 5,895,015 A | 4/1999 | Saiz |
| 6,216,454 B1 | 4/2001 | Tsuzuki |
| 6,247,670 B1 | 6/2001 | Eliahou-Niv et al. |
| 6,499,690 B1 | 12/2002 | Katayama et al. |
| 6,988,357 B2 | 1/2006 | Dev |
| 7,204,674 B2 | 4/2007 | Wobben |
| 7,293,959 B2 | 11/2007 | Pedersen et al. |
| 7,989,973 B2 | 8/2011 | Birkestrand |
| 8,192,141 B1 * | 6/2012 | Dale .................... F04D 19/022 415/199.5 |
| 8,651,813 B2 | 2/2014 | Long |
| 8,742,610 B2 | 6/2014 | Brown |
| 9,004,864 B2 | 4/2015 | Stimm |
| 9,187,987 B2 | 11/2015 | Greene et al. |
| 9,328,576 B2 | 5/2016 | Cramer et al. |
| 9,816,383 B2 | 11/2017 | Birkestrand |
| 9,816,384 B2 | 11/2017 | Birkestrand |
| 9,835,140 B2 | 12/2017 | Henderson et al. |
| 2011/0079010 A1 | 4/2011 | McBride et al. |
| 2011/0116923 A1 | 5/2011 | Larsen et al. |
| 2011/0142681 A1 | 6/2011 | Fisher et al. |
| 2012/0061972 A1 | 3/2012 | Young |
| 2012/0104752 A1 | 5/2012 | Tsutsumi et al. |
| 2012/0161442 A1 | 6/2012 | Chapple |
| 2017/0211829 A1 | 7/2017 | Slack et al. |
| 2018/0298881 A1 | 10/2018 | Mathers |

FOREIGN PATENT DOCUMENTS

| | | |
|---|---|---|
| JP | S-6111403 A | 1/1986 |
| JP | H-11132307 A | 5/1999 |
| RU | 2193090 C1 | 11/2002 |
| RU | 2224077 C2 | 2/2004 |
| WO | WO-2008/111922 A2 | 9/2008 |
| WO | WO-2009/097850 | 8/2009 |
| WO | WO-2015/012677 A1 | 1/2015 |

* cited by examiner $F_L/F_D \geq 30:1$

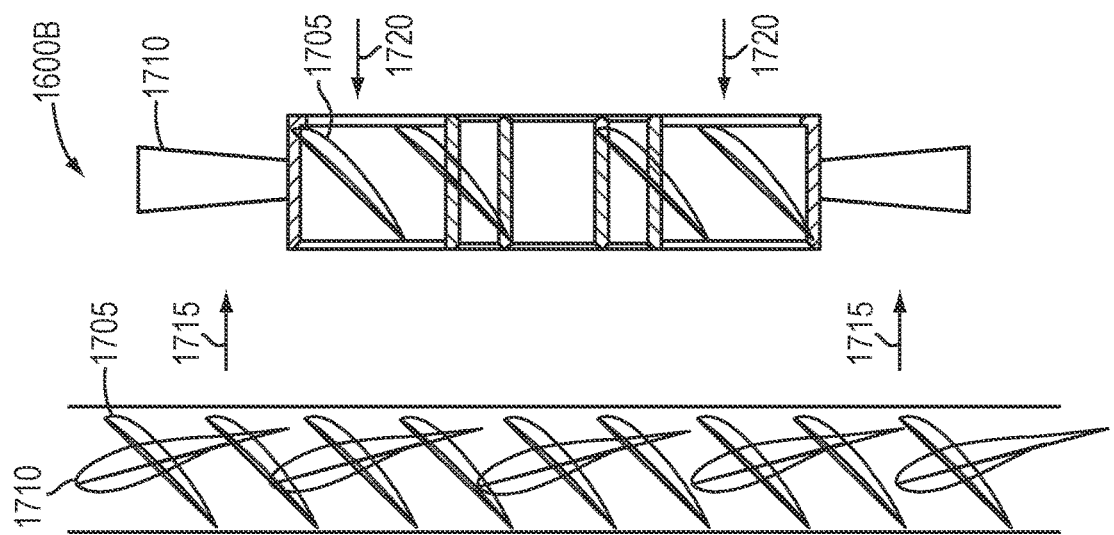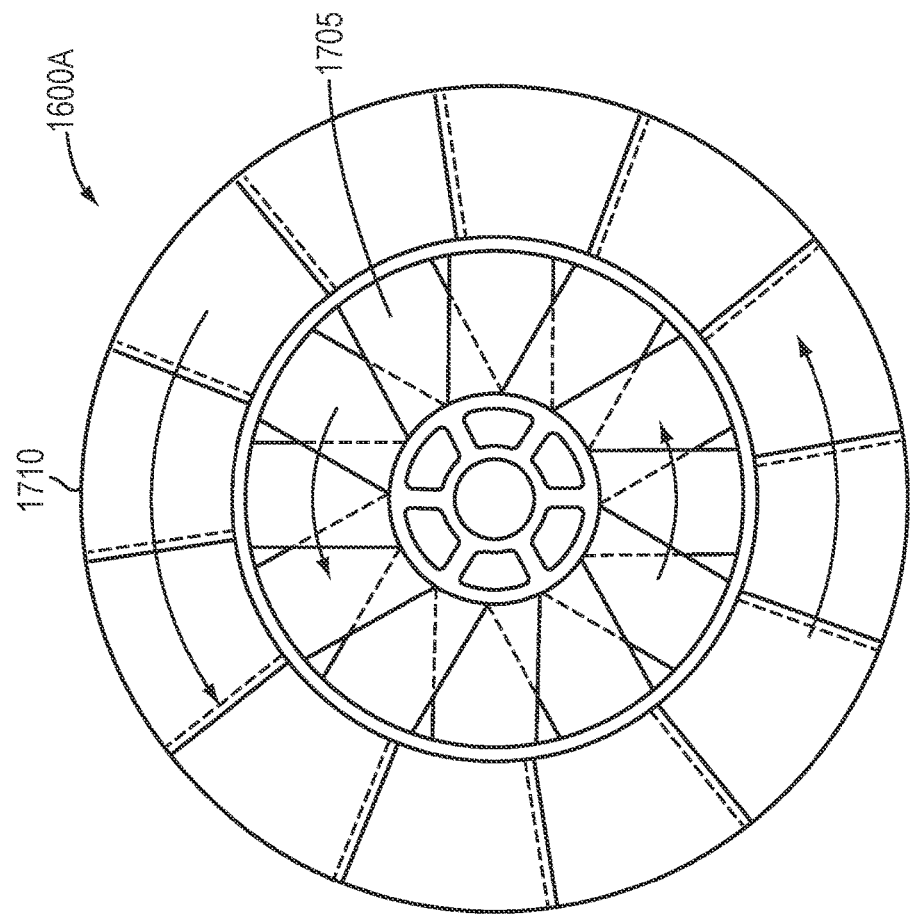

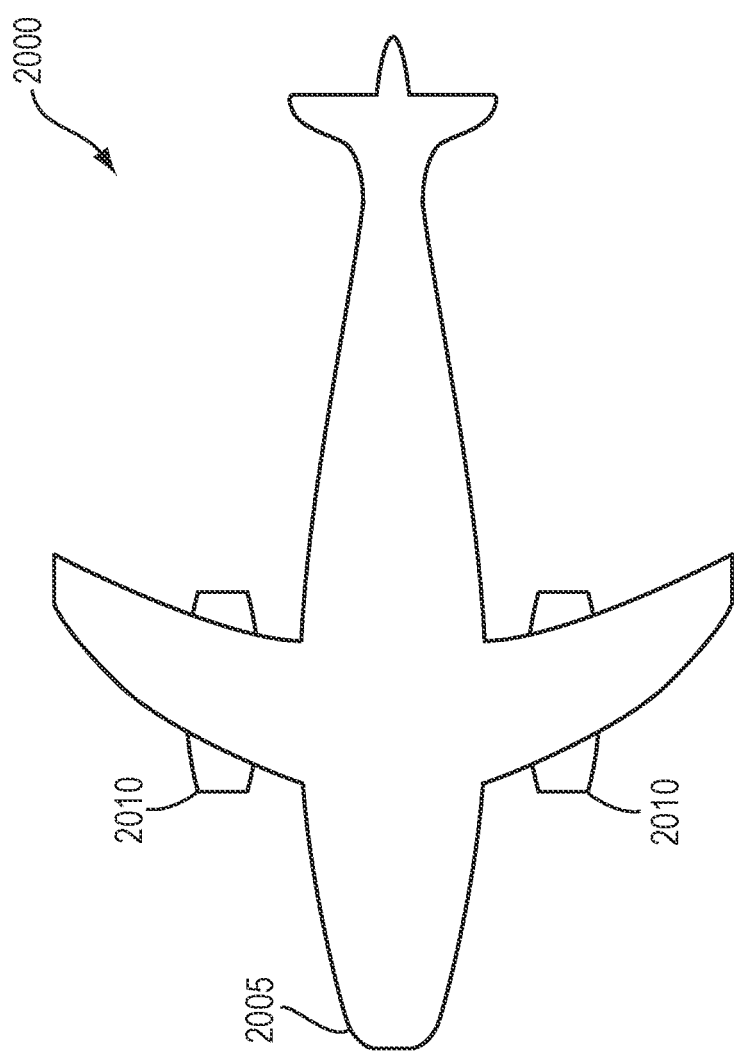

OPEN AND CLOSED CYCLE LIFT FORCE TURBINES

CROSS-REFERENCE TO RELATED APPLICATIONS

The present application is a continuation-in-part of commonly assigned copending U.S. patent application Ser. No. 17/186,739, which was filed on Feb. 26, 2021, by Orville J. Birkestrand for TOROIDAL LIFT FORCE ENGINE, which claims the benefit of priority to U.S. Provisional Patent Application Ser. No. 62/982,421, filed on Feb. 27, 2020 entitled TOROIDAL LIFT FORCE ENGINE, by Orville J. Birkestrand, which applications are hereby incorporated by reference.

The present application is related to: U.S. patent application Ser. No. 13/729,205, filed on Dec. 28, 2012 entitled POWER GENERATION APPARATUS, issued on Nov. 14, 2017 as U.S. Pat. No. 9,816,383; U.S. patent application Ser. No. 14/141,986, filed on Dec. 27, 2013 entitled POWER GENERATION APPARATUS, issued on Nov. 14, 2017 as U.S. Pat. No. 9,816,384; and U.S. patent application Ser. No. 15/482,313, entitled WIND TURBINE filed on Apr. 7, 2017, all by Orville J. Birkestrand, the contents of each are hereby incorporated by reference.

BACKGROUND

FIG. 1 is a front view of an exemplary prior art farm windmill 100 that is well known to those skilled in the art. The windmill 100 includes a plurality (typically 18) of blades 105 that are configured in a substantially circular arrangement and operatively interconnected with a gearbox 110. A platform 115 is arranged slightly below the bottom level of the blades 105 to enable easy access to the blades 105 and/or the gearbox 110 for maintenance purposes, etc. The gearbox 110 is operatively interconnected with a pump pole 120 which terminates in a connector 125. The connector 125 is further interconnected with a pump rod 130 that is encased by a standpipe 135 that extends into a well 140. Typically, a well casing 145 surrounds the entry into the well 140 and provides support for a discharge point 150.

A windmill tower 160 provides structural support so that the blades 105 are located at a substantial height above the ground to enable wind to reach them without obstructions from buildings, terrain, etc. The tower 160 also provides support to counteract the forces caused by the blades 105 rotating in the wind, which may be a lateral force that could cause the windmill to tip over if the wind reaches a sufficient velocity. As such, windmills 100 typically are configured to rotate out of the wind in the event that the wind speed reaches a predetermined threshold. This protects the blades 105 and tower 160 from damage and/or destruction caused by the blades rotating at too high a speed and/or generating too much lateral force on the tower 160.

In operation, the wind causes the blades 105 to spin, thereby turning the gearbox 110, which activates the pump via the pump rod 130 to provide a conventional pumping mechanism to draw water from the well's reservoir to be discharged out the discharge point 150. As will be appreciated by those skilled in the art, the farm windmill 100 is typically limited to pumping water (or other fluid). A conventional farm windmill 100 is further limited to certain wind speeds and has an extremely low efficiency at higher wind speeds. This low efficiency results from their primary design to produce torque at low wind speeds to supply sole source water on even nearly windless days to distant and dependent animals.

FIG. 2 is an exemplary front perspective view of a modern prior art wind turbine 200 that may be utilized for power generation. The wind turbine 200 comprises a plurality (typically three) of blades 215 that are mounted on a hub that is supported by a tower 210. Typical modern wind turbines are mounted at heights on the order of tens of meters (e.g., 90 meters) with blades that are also on the order of tens of meters long. Modern wind turbines 200 often encase all operating components within the tower 210 or within the supporting base 205. As such, external views of the wind turbine do not display its operation as it does for a conventional farm windmill 100.

A noted disadvantage of modern wind turbines 200 is that they typically do not include a separate mechanism to prevent stalling of the wind turbine should the wind flow slow down or should a highspeed spike occur over the blades 215. Commonly, such micro stalls occur due to, e.g., momentary spikes and/or lulls in the wind flowing over the blades 205 of the turbine 200. Without a mechanism to combat such spikes or stalls, the overall efficiency of the wind turbine 200 is significantly further reduced. Modern wind turbines do not have a simple control system to actively automatically track the rotor's rotations per minute (RPM) in relation to the wind's instantaneous speed to maintain the desired wind attack angle at all times. Instead, they commonly mainly operate at approximately one speed (RPM) to generate a required grid frequency. More recent machines may be equipped with elaborate and expensive electronic control systems which permit modest speed variations on the order of +20%. Such control limitations limit their possible maximum efficiencies. Additionally, they have to operate as tip speed rations (TSR's) of 6 or more with their blade chords at the rotor tip in the plane of the rotor, so that they are not back winded and stopped when the wind suddenly stalls, as they would with the ever present and unavoidable atmospheric turbulences.

Conventional three-bladed windmills/wind turbines capture only the tangential portion of the lift force, or about 6%, of the total lift forces generated because they normally operate at a TSR of 6 or more. The remainder or normal component of the lift forces is counteracted by trying to overturn the tower and is consequently totally unutilized. This causes exemplary towers 160, 210 and/or foundations 205 to be overbuilt in order to prevent the tower from being tipped over. Further, conventional windmills illustratively capture none of the possible productive forces to produce useful power from the flow from one blade enhancing the flow over other neighboring blades.

Under conventional thinking, all wind machines are limited by the Betz law that states that no turbine can capture more than 16/27 (59.3%) percent of the kinetic energy in the wind. This factor 16/27 (or 0.593) is known as the Betz limit. Conventional state of art three bladed windmills currently peak at approximately 75 to 80% of the Betz limit. The Betz limit claims to produce a theoretical upper bound amount of energy that may be extracted at any particular windmill site and is reasonable for drag type forces but does not apply to lift type forces. Even assuming (hypothetically) that the wind blew in a particular location continuously, no more than the Betz limit of the kinetic energy obtained in that year's wind may be extracted in keeping with common experience; however, this may be coincidence of the maximum possible with a three bladed conventional machine. In practice, most current systems do not reach a performance rate of even 50% of the Betz limit. The vast majority have typical rates of between 20% to 40% of the Betz limit.

A further noted disadvantage of modern wind turbine operation is that their relatively rapidly rotating rotor blades foul the surrounding air, making adding more blades not productive, and typically produce annoying sounds. Further, they may be a danger to flying animals, such as birds. For these and other reasons, conventional wind turbines are not practical or desirable for use in or near urban/suburban neighborhoods where the vast amount of power is consumed. Rather, they are typically placed in large groups (i.e., wind farms) at locations where they may be serviced efficiently and where they are exposed to higher velocity winds. As a result, they require extensive transmission systems to carry the generated electricity to where it is needed.

Further, for all prior art wind machines, their energy harvested does not increase faster than $D^2$, where D is the diameter of the blades. An additional major disadvantage of prior art wind turbines is that they operate of tip speed ratios (TSRs) of 6 or more, which requires that they must be located on exceptionally tall towers to reach not only faster moving winds but also to reach less turbulent winds. Consequently, they are recommended to be located a substantial distance (e.g., 500+ feet) from any obstructions, such as trees, buildings, or other wind machines in order to function properly. Further, with TSRs of 6 or more, should a wind gust come along and lower the TSR to, e.g., 5 or less, a conventional 3-bladed wind turbine typically will have flow separation and loss of power due to a micro-stall occurring as they have no mechanism of coarse tracking of the wind's speed nor limiting the range of possible attack gusts changing the attack angle of the apparent wind on their blades, thereby reducing the possible captured power.

In summary, while both the farm wind mill and the conventional 3-bladed utility scale wind machines are commercially successful at their tasks, they do not have the optimum blade array for high speed and/or high power turbine/engines. This is due to the fact that the farm windmill operates over a limited low wind speed range of about 6-18 MPH with a TSR of about 1.25 or less in order to consistently generate torque and pump water at low, but turbulent wind speeds. Above TSR's of about 1.25, its blades are back winded by the normally present turbulent nulls, preventing them from ever reaching higher TSR's and resulting higher power levels. The 3-bladed machines, operating at TSR's of 6 or more, also to accommodate the ever-present turbulent winds, operating over a wind speed range of approx. 11-25 MPH, already have their blade tip speeds nearing the speed of sound at these low wind speeds, becoming increasingly noisy. They clearly are not candidates for machines operating at wind speeds of say 50 to 750 MPH, as their blades tips would have to be 6 or more times that. Additionally, these machines foul the surrounding air and only productively interact with perhaps approximately 5% of the molecules passing through their blade disc. Further, neither of these machines are equipped to properly regulate and/or control the wind's angle of attack (a) upon their blades in real time, making them unsuitable for an engine application. What is required is a machine that can control a in real time, operate at TSR's of about 1.00-6 over a speed range of about 10:1.

Finally, and perhaps most importantly, the only harvestable energies with the modern wind turbine are from the tangential part of the lift forces. The normal part of the lift force, which works to cause the tower to tip over, is several times, even as much as an order of magnitude larger, more powerful and is unutilized and wasted. Additionally, wind power is notoriously intermittent, necessitating costly investments in backup/gap filling power systems.

Gas jet engines have their own problems and limitations. For example, they are extremely complex and require some of the most advanced and sophisticated engineering and manufacturing talents and techniques, which often drives their costs up and beyond $1-5,000 per pound. Additionally, to reach maximum efficiencies, some of todays' engines approach internal temperatures of 3,100 degrees Fahrenheit, drastically limiting their useful life before necessary major and costly over hauls are required. To operate at these temperatures requires some of the most exotic, expensive, and rarest materials available. Further, modern jet fighters, like the F135, burn fuels up to 0.70 lb/lbt/hr cruising @ 27,000 lbt to 2.0 lb/lbt/hr with after burner @ 41,000 lb thrust or approx 28,700 lb fuel per hour, costing approximately $16,072. per hour with after burner, depending upon the local price of fuel. A Boeing 747 reportedly burns approximately 5,000 gallons of fuel per hour while cruising, costing about $19,300 per hour. Finally, each gallon of jet fuel burned reportedly produces 21.1 lb of $CO_2$. Business and commercial aviation alone reportedly produces approximately 2.5% of worldwide $CO_2$ pollution, or about one billion tons, per year. Travel by airplane is reportedly the most polluting means of travel and the one that generates the most greenhouse gas emissions. This is not sustainable.

All current gas jet turbines need to operate in an atmosphere containing sufficient oxygen to burn fuel to provide thrust. They also require exotic materials to operate in high temperatures to be efficient as well as transport significant volumes/weight of fuel, which significantly limits their acceleration/deceleration as well as general flight performance and range.

Power boat users have long been groomed to believe that they must burn something to get from point A to point B. Originally it was dung or wood, but then it progressed to coal, then oil to gas. Even now, some believe that an exotic nuclear fuel must be "burned" to get from A to B. This contrasts to sailboat people who have known all along that Lift Forces alone can get them wherever they wish to go and often faster.

SUMMARY

The above and other disadvantages of the prior art are overcome by an open cycle lift force turbine (OCLT) in accordance with illustrative embodiments of the present invention. The open cycle lift force turbine illustratively operates in the same atmosphere as a gas jet turbine environment and utilizes the normal component of its lift forces to generate direct thrust with the tangential component providing additional thrust force driving a "By-Pass" type fan and to drive an axial flow compressor as well as the auxiliaries and speed control accessories. The open cycle lift force turbine is illustratively comprised of two turbine assemblies that operate as a solid combination rotating structure in a pass through gas environment.

The outer reverse flow turbine is a high speed, typically operating at about 20,000 to 30,000 RPM, high lift low drag (HLLD) lift turbine that captures lift forces, due to its asymmetrical surface pressure forces, to directly generate thrust in the desired direction of vehicle motion as well as drive accessories from the rotation of the lift turbine blades in the gas. Illustratively, the gas is counter pre-rotated and orientated by a set of blades of an input stator before the gas impacts the blades of the lift turbine. A further set of blades of an exit stator work to calm and redirect the flow after passing through the lift turbine. Illustratively, the lift to drag ratio (L/D) for the lift turbine is greater than 1.

The second inner turbine part of this combination structure is an efficient axial flow compressor type turbine that works mainly to provide the outer lift turbine with a steady RPM to match the incoming stream of high velocity gas coming from the By-Pass Fan and Ram Air. The axial flow turbine illustratively also includes an input and exit stator having blades that are configured to help condition the gas prior to it entering the input stator of the lift turbine assembly.

In operation, the gear driven slower speed, typically operating at 4,000 to 6,000 RPM, front bypass fan and Ram Air provides by-pass and throughput flow to the axial flow and Lift turbines, enhances the throughput flow, and works to provide a steady stream of high speed gas to the lift turbine. Illustratively, the lift turbine assembly and the axial flow turbine assembly are configured in a continuous flow arrangement. That is, the exit flow of the gas from the axial flow turbine assembly flows into the input stator of the lift turbine assembly, through the lift turbine and out the lift turbine exit stator, to rejoin with the bypass flow.

The open cycle lift force turbine may be utilized to provide a thrust force independent of the oxygen content of the surrounding atmosphere. By mounting an open cycle lift force turbine in a vehicle, the thrust may be used to accelerate and propel the vehicle. Since this thrust force does not involve burning oxygen it is independent of the chemical components of the outside atmosphere. Further, an open cycle lift force turbine would operate equally well on the surface of a planet with or without oxygen in its atmosphere.

Illustratively, an open cycle lift force turbine may be mounted in an aircraft similarly to and replacing a gas jet engine. Before and during normal flight take off operations, the battery powered electric starter-generator in the hydraulic circuit drives the Lift Turbines' hydraulic motor/pump until the Lift Turbine gets up to speed, powering the vehicle while cruising thereby saving substantial fuel as well as pollution costs. As long as the vehicle is moving at sufficient speeds, the thrust generated by the open cycle high speed lift force turbine provides sufficient thrust for straight and level/cruising flight operations, extending its range, without further fuel and/or electrical input as the Lift Forces are more powerfull than the Drag Forces in the direction of motion.

Further, the rotation of the lift turbine of an open cycle lift force turbine may be used to power a pump configured to pump a fluid, such as hydraulic fluid, which may be used to power heat exchangers, generators, etc. In this manner, an open cycle lift force turbine may be used to power the vehicle, with electricity, hot water, heat, and/or air conditioning. The general jet turbine shape is really ideal for this application, as it is desirable to have the mean blade velocity in the high-speed lift turbine to be approximately 1 to 6 times the velocity of the gas flowing through it, with its RPM moderated by the axial flow turbine, regulated by the pressure compensated needle valve in the hydraulic control circuit and controlled remotely either automatically or by an on-site operator controlled throttle. Illustratively, at the same time the slower speed gear driven By-Pass Fan and Ram Air drive the same gas through the axial flow turbine with the turbine's overall exit velocity to be nearly identical to its input velocity as there is no fuel being burned with resulting gas expansion for maximum theoretical efficiency and noise reduction, with no heat or light involved minimizing their ability of being detected by sensitive, hostile and/or unfriendly entities. This results in maximum thrust as the By-Pass Fan, the axial compressor and the Lift Turbine flows are all so arranged that their surface thrust forces are additive and all in the same direction. This is unlike the typical gas jet engine, wherein the thrust forces generating within its power turbine, sometimes the largest thrust force generator, are generally counterproductively opposed to the other forward thrust forces. In some designs it appears that the net jet engine thrust forces could be doubled or more should it be that they be properly aligned instead of opposed.

BRIEF DESCRIPTION OF THE DRAWINGS

The above and further advantages of the present invention are described in connection with the accompanying drawings in which like reference numerals indicate identical or functionally equivalent elements:

FIG. 16A is a forward view of exemplary blades for an exemplary lift and axial flow turbine in accordance with an illustrative embodiment of the present invention;

FIG. 16B is an exemplary cross-sectional view of exemplary blades for an exemplary lift and axial flow turbine in accordance with an illustrative embodiment of the present invention;

FIG. 20 is a view of an open cycle lift force turbine in an aircraft or other moving vehicle in accordance with an illustrative embodiment of the present invention.

DETAILED DESCRIPTION OF AN ILLUSTRATIVE EMBODIMENT

Figure 1:
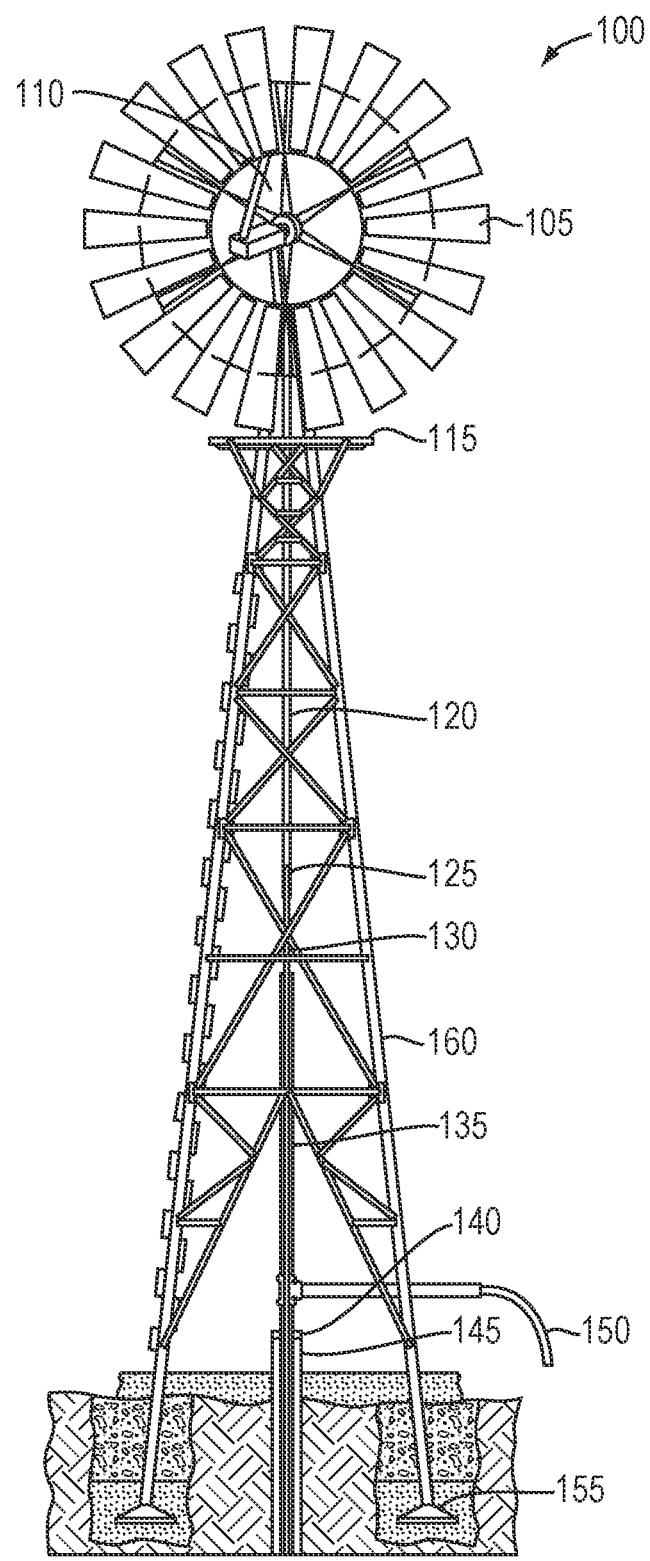
FIG. 1, previously described, is a front view of an exemplary farm windmill as is known in the prior art.
Figure 2:
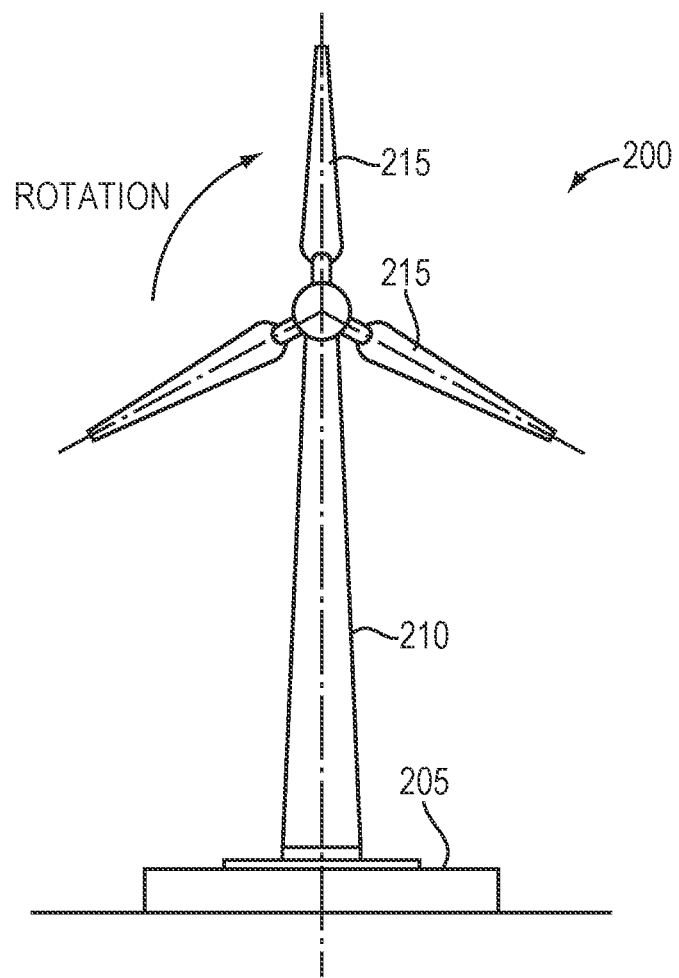
FIG. 2, previously described, is a front view of an exemplary three-bladed wind turbine as is known in the prior art.

As noted above, Betz's Law conventionally states that the maximum efficiency of all machines designed to extract energy from a flowing stream (wind, water, or other fluid) is limited to 16/27 or approximately 59.3% of its kinetic energy by claiming that this is demanded by the law of conservation of energy. While Betz's Law appears to apply to existing machines, this appearance is coincidental and not causal. As noted above, conventional three bladed wind machines harvest, at best, approximately 6% of the total lift forces developed and 0% of the normal forces. The best or most efficient machines from low wind speeds up to approximately 18 miles an hour is still an old farm windmill, described above in relation to FIG. 1.

Typical farm windmills will rotate out of the wind stream at speeds above approximately 18 miles an hour. The blades on farm type windmills also harvest only a portion of the tangential component of the lift forces and are typically set at an approximately 45° angle for good start up torque with their speed regulated by the size of the pump load. When the blade speed exceeds the wind speed, the blades back wind and stall, thereby preventing the machine from ever reaching higher TSR's and resulting higher power levels. Machines with blades set for higher TSR's will not start up, failing to reach operating speeds, mainly because of turbulent nulls, which causes back winding of the blades. The illustrative open cycle lift force turbine of the present invention utilizes the normal component of the lift force as well as the tangential component to harvest a greater amount of energy from a flowing fluid, thereby resulting in a more efficient machine than conventional farm windmills and/or modern three bladed wind turbines.

Conventional and gas jet type machines are limited to the local atmospheric density, velocity, and oxygen content, where power is proportional to the air's density times the apparent wind velocity cubed. The open cycle lift force turbine, operating according to these same rules, can well operate in most any atmosphere as it need not burn oxygen nor expel particles of any kind to produce thrust.

Specifically, Betz's law is based on a simplified version of the Bernoulli Equation that is expressly only for incompressible non-rotational flows. This is a reasonable assumption for most conventional windmills. As will be appreciated by those skilled in the art, the validity of the Betz limit assumes that the Bernoulli Equation applies. It should be noted that Bernoulli himself said that it does not apply as wind turbines experience decidedly rotational flow. Moreover, an open cycle lift force turbine made in accordance with various embodiments of the present invention creates and enhances highly rotational flows, which augment and reinforce the normal and tangential lift forces that are generated. Lift forces, which were not known in Bernoulli's or Newton's time, may be utilized to harvest a significantly greater amount of energy from the wind.

Figure 3A:
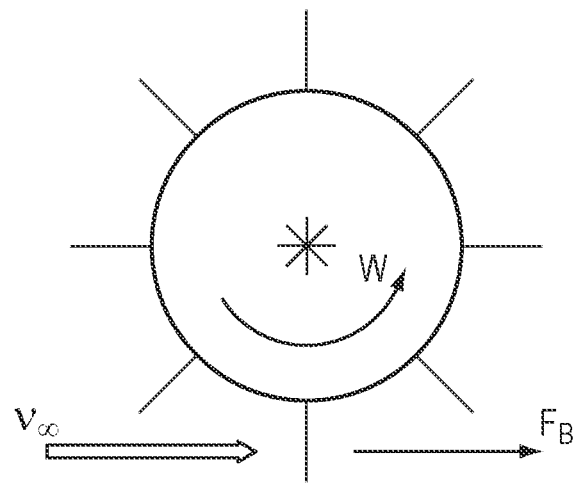
FIG. 3A is a diagram illustrating the Bernoulli force with a rotating device.

FIG. 3A is in exemplary diagram illustrating the Bernoulli force in accordance with an illustrative embodiment of the present invention. As illustrated in FIG. 3A, the wind (or other fluid) $V_\infty$ engages a lever arm of a rotational device, such as a waterwheel. In such an environment, the fluid flow is transferred to rotational movement W. More generally, $V^\infty$ interacts with a lever arm and applies $F_B$, i.e., a drag force, to the arm, which is translated into rotational movement. This is an example of the conversion of kinetic energy to potential energy and Newton's $3^{rd}$ Law.

Figure 3B:
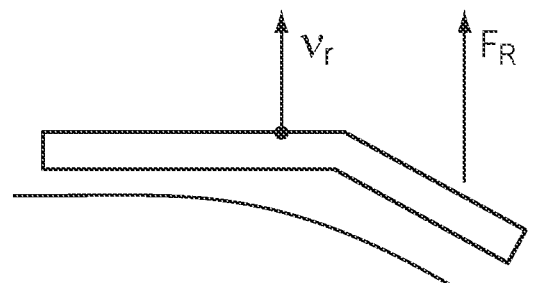
FIG. 3B is a diagram illustrating reaction force with an angled surface.

FIG. 3B is an exemplary diagram illustrating the reaction force, i.e., momentum exchange, in accordance with an illustrative embodiment of the present invention. As illustrated in FIG. 3B, fluid flow ($V_\infty$) causes a reaction force $F_R$ when the fluid interacts with an angled surface causing it to rotate/move at velocity $V_r$. This exchange forms the basis of conventional windmills and/or wind turbines. Bernoulli specifically excludes the applicability of his theory to devices of this type.

Figure 3C:
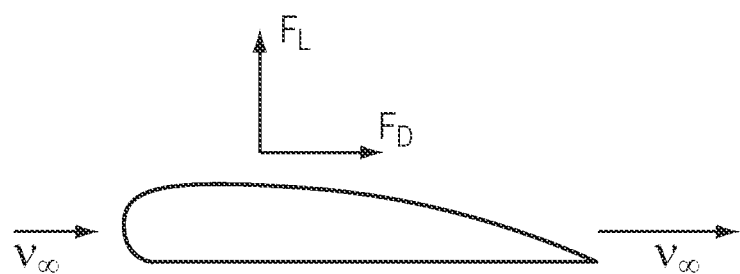
FIG. 3C is a diagram illustrating lift force over a blade.

FIG. 3C is a diagram illustrating lift forces in accordance with an illustrative embodiment of the present invention. As illustrated in FIG. 3C a fluid flows ($V_\infty$) over a shaped blade at a particular attack angle ($\propto$) that generates lift forces $F_L$ at right angles to the flow $V_\infty$. Drag force $F_D$ is also generated from the fluid impacting the blade. However, in typical embodiments the lift forces $F_L$ are substantially greater than the drag forces $F_D$ by a factor of at least 30 to 1 ($F_L/F_D \geq 30:1$). For example, Dr. Robert Liebeck has developed shaped blades, such as his Douglas/Liebeck LNV109A shape, that reportedly have L/D ratios exceeding 150:1. Currently, there is no proper concept of, or a place for a "Lift Force Energy".

An exemplary open cycle lift force turbine of the present invention illustratively utilizes lift forces to generate substantially more power density than a conventional wind turbine that only uses Bernoulli and/or reaction/drag forces. Further, the generation of lift forces creates an asymmetric pressure distribution on the blade as well as Newton's momentum exchange. After the apparent wind has imposed its asymmetrical pressure distribution upon the blades, it may either exit the machine and/or be internally recycled in a closed cycle. Conventional wisdom does not normally, if ever, differentiate these two, but my open cycle lift force turbine almost exclusively utilizes the forces from this asymmetrical pressure distribution. Lift force was unknown and not predicted by either Bernoulli or Newton. They provided no guidelines on what energies may be extracted from a system using asymmetrical pressure distribution lift forces and since it is not a heat engine, the well-known laws of thermodynamics do not apply.

Figure 4:
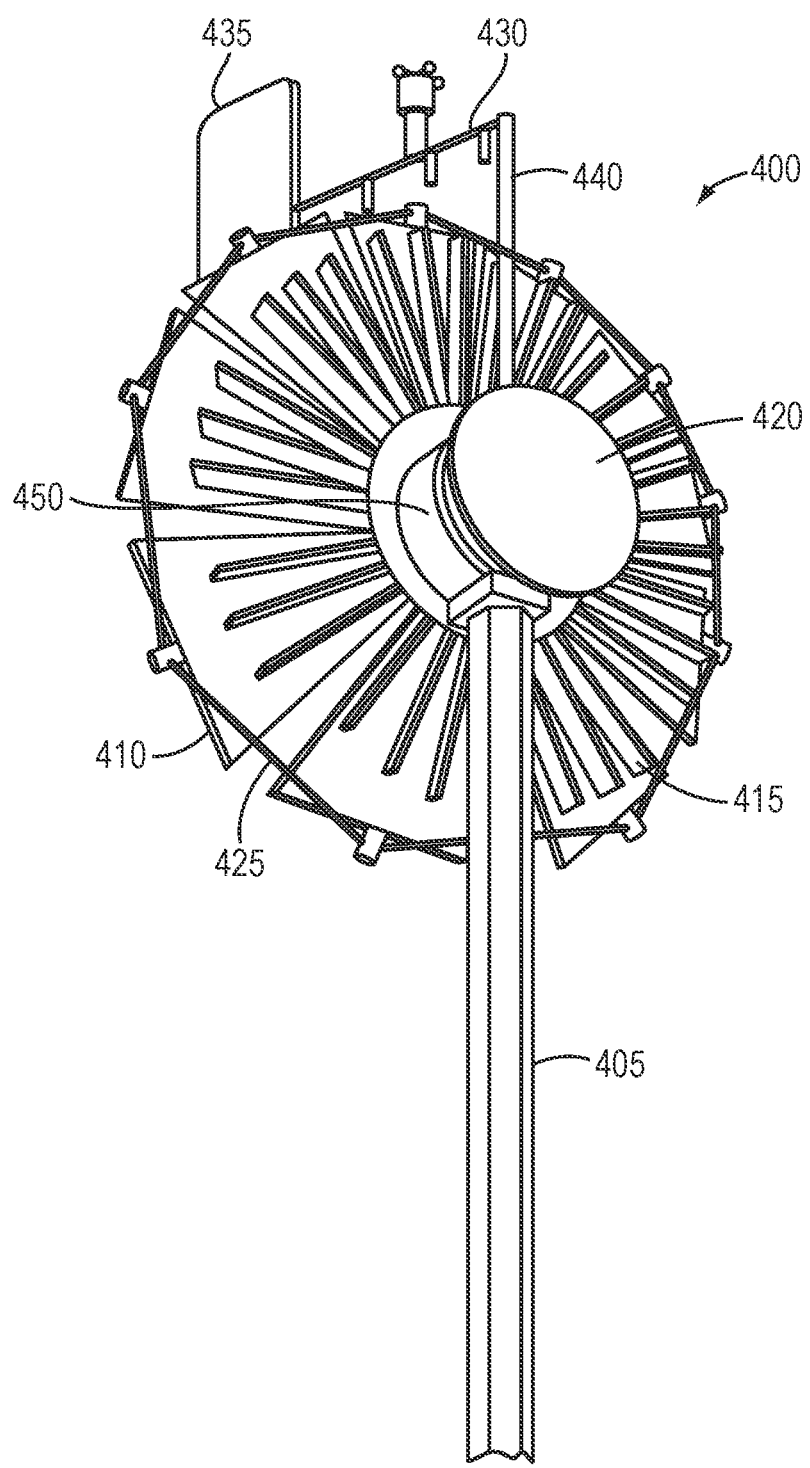
FIG. 4 is a perspective view of an illustrative horizontal axis lift turbine (HALT) in accordance with an illustrative embodiment of the present invention.

FIG. 4 is a perspective view of an exemplary horizontal axis lift turbine (HALT) 400 that illustrates certain features of an open cycle lift force turbine (TLE) in accordance with an illustrative embodiment of the present invention. Illustratively, the HALT 400 exemplifies the advantages of pre-rotating and orientating a counter-rotating flow using stationary blades prior to the flow impacting rotating blades. This counter-rotating and oriented pre-rotation compresses the range of the possible angles of attack of the flow ($\propto$) on the rotating blades and combined with the fluid flow off the immediate previous blade energizing its most critically appropriate boundary layer, serves to avoid stalls should a momentarily lull in the flow occur and which appears to contradict the universality of Newton's Third Law.

The HALT 400 is illustratively supported at an elevated position by a tower 405. The exemplary tower 405 may be supported by a variety of types of bases in accordance with various alternative embodiments of the present invention. In one embodiment, the tower 405 may be anchored to a base (not shown) that is permanently fixed. In an alternative embodiment of the present invention, the tower 405 may be anchored to a pivoted base (not shown) that enables the tower to be moved between a raised position and a lowered position. An exemplary pivoted base may enable ease of maintenance, replacement, and/or repairs by enabling the HALT 400 to be lowered to a position closer to the ground. As will be appreciated by those skilled in the art, such a pivoted based would obviate the need for ladders or other lifting mechanisms to enable, for example, access to elements of the HALT for repair/maintenance purposes.

The HALT 400 illustratively comprises of a nacelle 450 that supports a nose dish 420, a plurality of rotating blades 410, a plurality of fixed blades 415, and a tail component 435. In addition to the rotating blades 410 and fixed blades 415, an exterior support structure 425 links the outer edges of each of the rotating blades 410. Illustratively, the support 425 provides additional structural stability to the rotating blades 410. The tail component 435 is illustratively supported by a lateral support 430 that is operatively interconnected with a pole support 440. It should be noted that in alternative embodiments of the present invention, a HALT 400 may comprise additional and/or differing arrangement of components. As such, the description contained herein of specific components should be taken as exemplary only.

The nacelle 450 is illustratively mounted to tower 405 so that it may rotate. As will be appreciated by those skilled in the art, various mechanisms, e.g., a bent axis positive displacement high efficiency hydraulic pump/motor capable of high speeds (not shown), etc., may be mounted in the nacelle 450 and operated by rotation of blades 410. One of the major insights in developing the exemplary HALT machine was the discovery of a simple automatic technique of getting the working blade rotor 410 to regularly and automatically track the wind speed in real time in a linear fashion, by use of an exemplary simple needle valve in a closed loop control circuit, such as that disclosed below in FIGS. 12 and 21.

The power of the wind varies as the cube of its velocity. If there is some device in its closed loop hydraulic control circuit which has a pressure drop proportional to the square of the fluids' velocity through it, which an orifice or needle valve readily and precisely does over an extended temperature range, the working blades rotor will/does track the wind speed in a linear fashion (1:1). Combined with a positive displacement hydraulic pump, the hydraulic fluid flow rate directly correlates in a linear fashion to the winds' speed. With the slow turning, large rotor of the HALT, it is quite easy to observe that it works very well at all wind speeds to control the wind's angle of attack on the blades. Illustratively, the HALT machine will not function properly without it. A similar system of closed loop control is used on the exemplary open cycle lift force turbine described herein.

As noted above, the nacelle 450 of the HALT is illustratively mounted on the tower 405 in a manner so that it may rotate to face the wind. In operation, the tail component operates to direct the rotating and fixed blades into the direction of the wind. Due to the robust design of the HALT and its control system, there is no need for the blades to rotate out of the wind at high wind speeds. Should the HALT experience the onset of ultrahigh winds, such as typhoons and/or hurricanes, the entire machine can be automatically and remotely lowered to the ground to be housed and protected. Such lowering may be accomplished by, for example, having a remotely controlled tower, by having a hinged tower that enables the assembly to be lowered, etc. Further, momentary gusts or drops in wind speed will not cause a loss of rotation as often occurs in prior art windmills or wind turbines. In accordance with illustrative embodiments of the present invention, the rotational system may include a braking and/or locking mechanisms to cause the tower mounted components to be fixed in a particular location. This may be necessary, e.g., for maintenance purposes, or if the tower is foldable to ensure that when the tower is lowered to the ground various components of the HALT are not damaged by impacting the ground. However, as will be appreciated by those skilled in the art, in accordance with alternative embodiments of the present invention, no braking or other locking mechanism is utilized. As such, the description of a braking/locking mechanism should be taken as exemplary only.

In operation, the stationary blades 415 cause a counter-rotating oriented pre-rotation of the wind prior to interacting with rotating blades 410. Illustratively, this counter-rotating pre-rotation compresses the possible angles of attack of the wind or other fluid as it interacts with the rotating blades 410. Combined with the needle valve control and having its most critical boundary layer energized by trailing fluid flows from its immediately previous blade, this aims to provide a better more continuous lift force as well as prevent momentary stalls of the rotating blades due to lulls and/or spikes in the wind.

Figure 5:
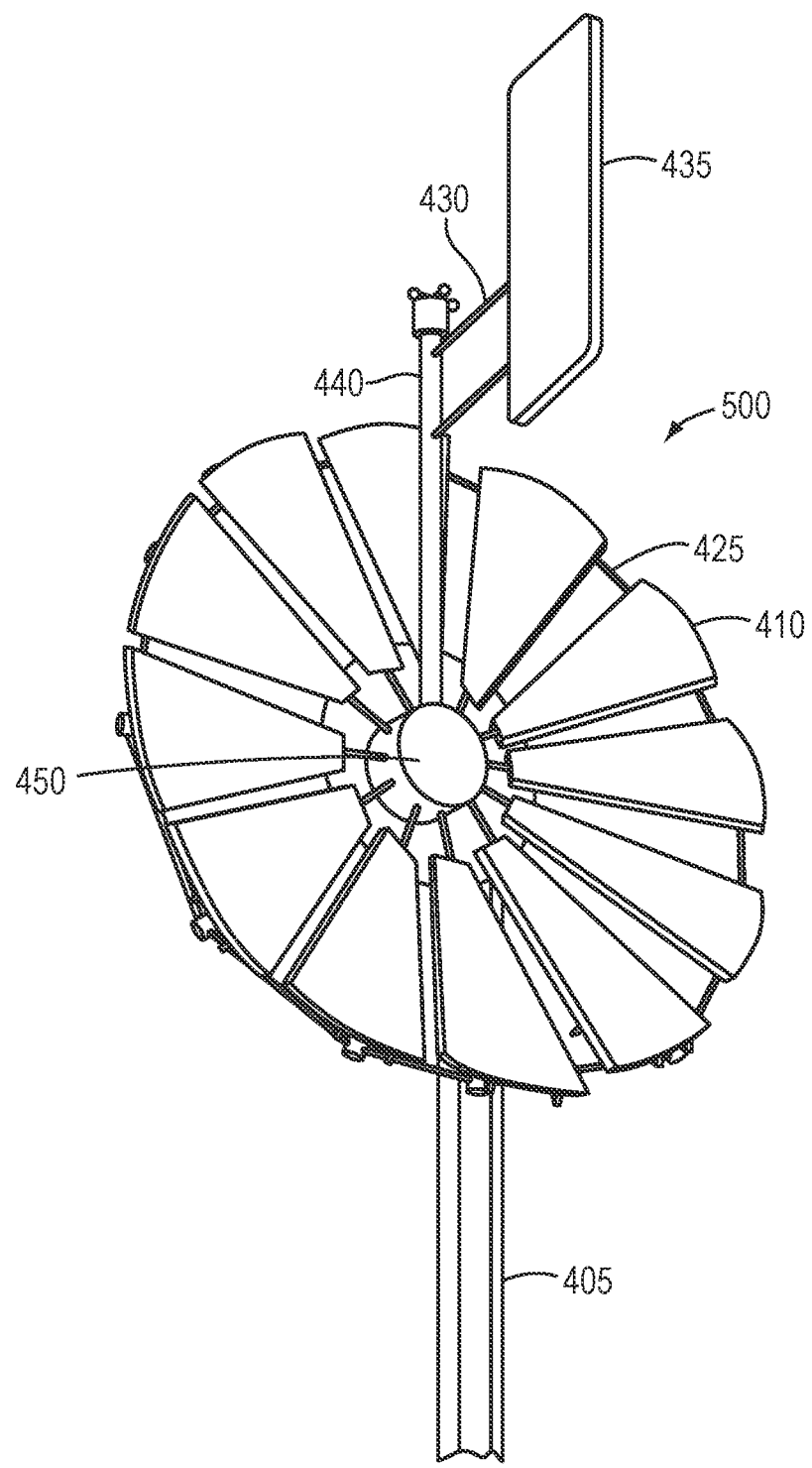
FIG. 5 is a rear perspective view of an exemplary HALT in accordance with an illustrative embodiment of the present invention.

FIG. 5 is a rear view 500 of an exemplary HALT 400 in accordance with an illustrative embodiment of the present invention. View 500 illustrates the top portion of tower 405 and a view of the rear of the rotating blades 410 and support 425. Pole support 440 and lateral support 430 are illustrated as well as the tail component 435.

One major difference between an exemplary HALT as compared to a conventional wind turbine or other turbines, such as a jet engine and/or steam turbine, is that the rotating blades 410 rotate into the flow of the wind or other fluid in apparent violation of Newton's Third Law. A jet, or gas engine, or other conventional turbine, such as the universally used steam power turbine, always rotates with the flow. As these are reaction or impulse machines, their blade rotation speed is invariably at slower speeds than the flow. This is in distinction to the open cycle lift force turbine's turbine which always rotates at approximately 1-6 times the velocity of its oncoming flow. In effect, it is "making its own wind." This pre-rotation of the fluid prior to impacting the rotating blades 410 helps to generate additional lift from the blades, as well as compresses the possible range of ∝, the wind attack angle, deteriorating the negative effects of spikes and nulls of normal turbulences in the working fluid.

Figure 6:
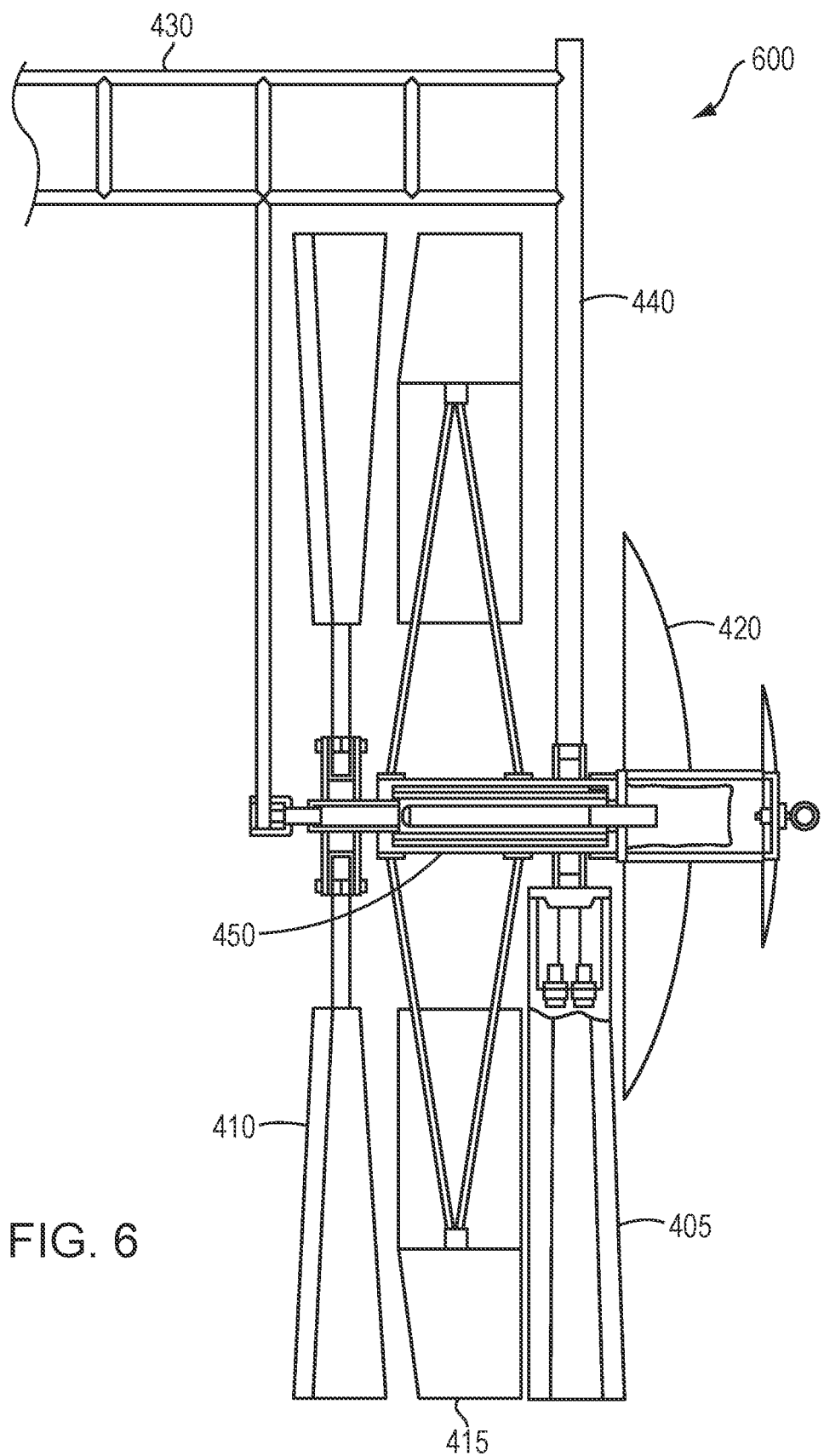
FIG. 6 is a side view of an exemplary HALT in accordance with an illustrative embodiment of the present invention.

FIG. 6 is a cross-sectional view 600 of an exemplary HALT in accordance with an illustrative embodiment of the present invention. Tower 405 is shown that supports a nacelle 450 that supports including fixed blades 415, rotating blades 410 as well as the tail structures 430, 435. The internals of the nacelle 450 are not shown. Nose dish 420 is mounted along a central axis of the HALT 400. Lateral support 430 as well as the pole support mechanism 440 are also illustrated. It should be noted that in accordance with an illustrative embodiment of the present invention, the rotating and fixed blades are disposed behind the tower 405 when viewed from the direction of the wind (or other fluid). However, it should be noted that in alternative embodiments the fixed and/or rotating blades may be situated in front of tower 405. Further, in alternative embodiments the rotating blades may be behind and the stationary blades may be in front of tower 405. As such, the description contained herein of fixed blades 415 and rotating blades 410 being located behind tower 405 should be taken as exemplary only.

Figure 7:
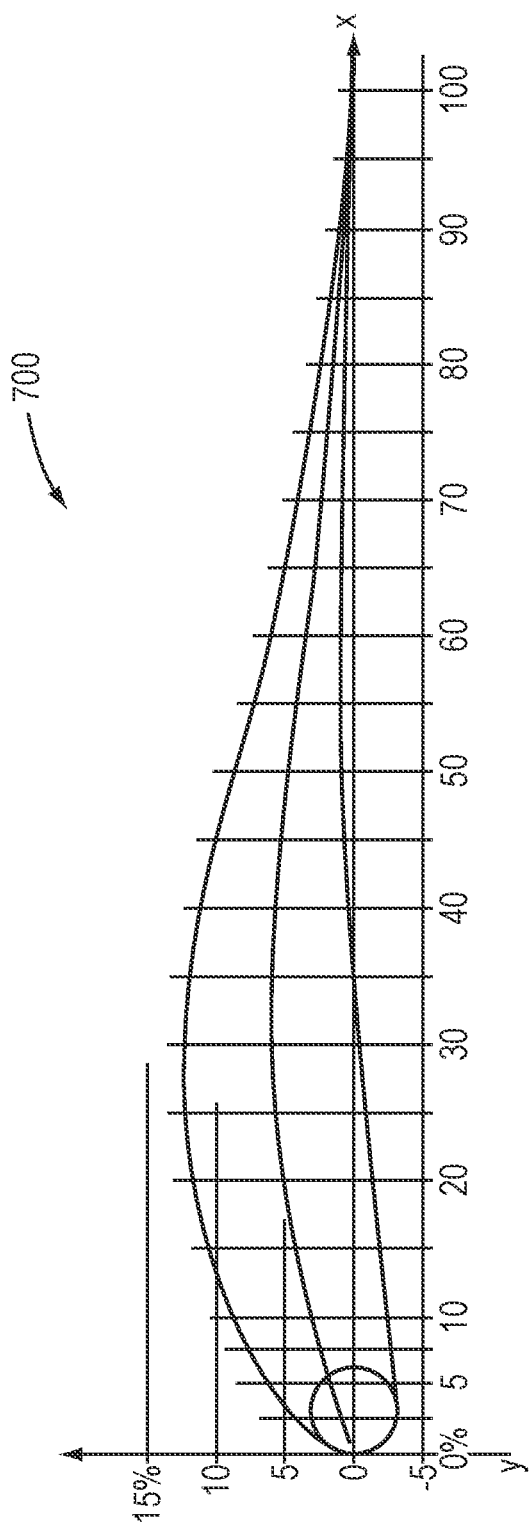
FIG. 7 is a cross-sectional view of an exemplary HALT blade in accordance with an illustrative embodiment of the present invention.

FIG. 7 is a cross-sectional view 700 of an exemplary rotating blade that utilizes Dr. Robert Liebeck's LNV109A High Lift/Low Drag airfoil that may be utilized in accordance with an illustrative embodiment of the present invention. This particular blade profile is thought appropriate as it has minimal aft concavity, which indicates that its extreme high lift/low drag (i.e., L/D) characteristics have more to do with asymmetrical pressure distribution rather than Newton momentum exchange down drafts. Illustratively, a rotating blade having the cross-section shown in view 700 may be utilized with a HALT, as described above in reference to FIGS. 4-7, or in an open cycle lift force turbine, as described further below. It should be noted that in alternative embodiments, differing cross sections may be utilized to achieve desired benefits. Therefore, the cross-section shown in view 700 should be taken as exemplary only and not limiting.

Chart 1 illustrates the dimensions based on percentages of an exemplary rotating blade chord in accordance with an illustrative embodiment of the present invention.

CHART1

| NOSE RAD 3.22% of C | | |
|---|---|---|
| X/C % | ±Y/C % | ±t/C % |
| 2.5 | .60 | 3.70 |
| 5.0 | 1.56 | 4.72 |
| 7.5 | 2.39 | 5.18 |
| 10 | 3.13 | 5.63 |
| 15 | 4.32 | 6.21 |
| 20 | 5.15 | 6.48 |
| 25 | 5.73 | 6.53 |
| 30 | 6.04 | 6.38 |
| 35 | 6.00 | 6.00 |
| 40 | 5.73 | 5.33 |
| 45 | 5.20 | 4.63 |
| 50 | 4.67 | 3.91 |
| 55 | 4.06 | 3.28 |
| 60 | 3.53 | 2.71 |
| 65 | 2.92 | 2.19 |
| 70 | 2.37 | 1.68 |
| 75 | 1.82 | 1.29 |
| 80 | 1.33 | .92 |
| 85 | .88 | .63 |
| 90 | .52 | .39 |
| 95 | .21 | .21 |
| 100 | .00 | .00 |

(C = Chord, t = thickness)

Figure 8A:
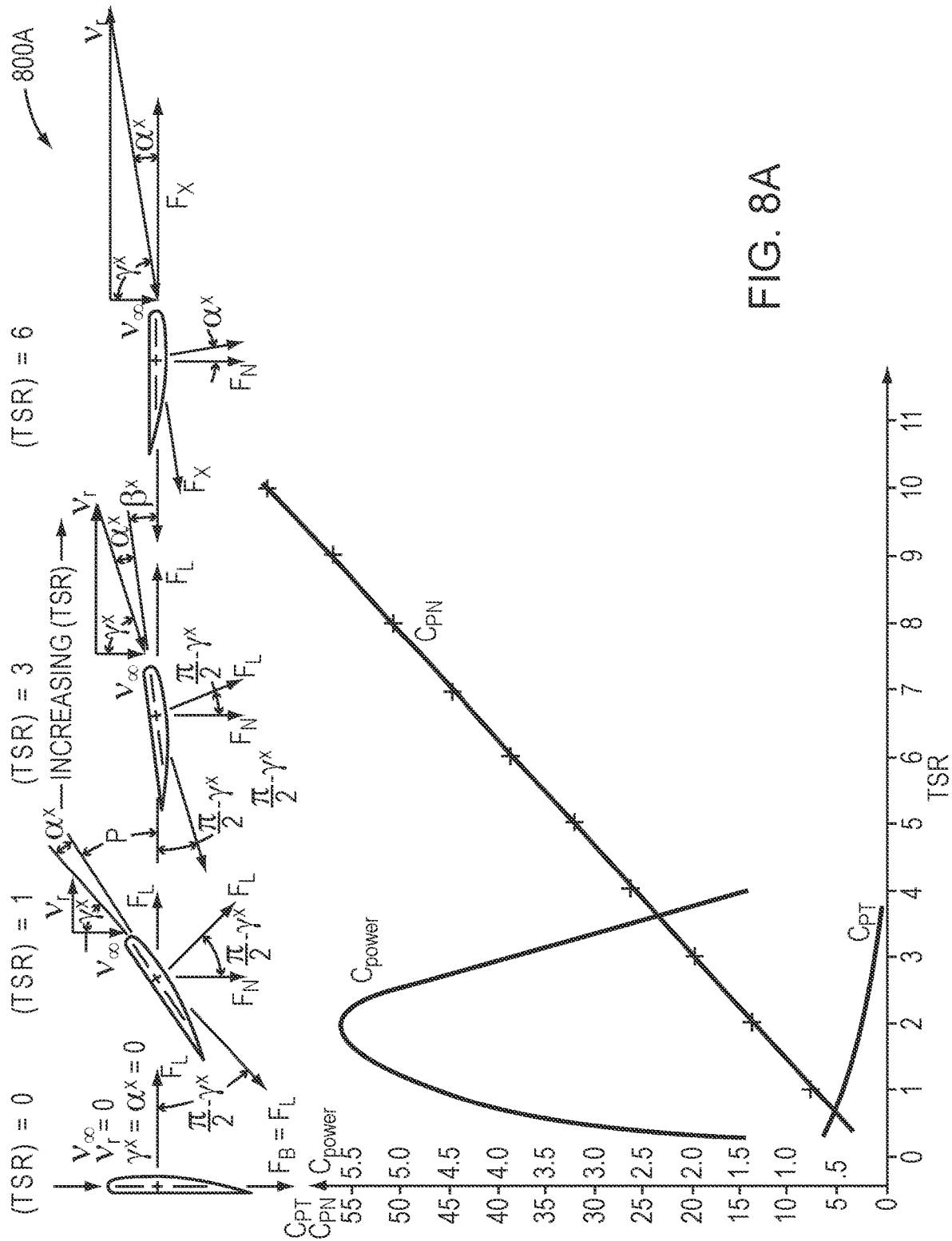
FIG. 8A is an exemplary chart illustrating the relationship among power torque and the distribution of lift force into the normal and tangential components with tip speed ratio (TSR) in accordance with an illustrative embodiment of the present invention.

FIG. 8A is a chart of a detailed mathematical analysis illustrating the general tangential and normal components of the lift/drag forces on all aeronautical shapes and how these shapes must orientate to maintain a working angle of attack at various TSR's, from a TSR of zero to a TSR of approximately 6. This model is in accordance with an illustrative embodiment of the present invention. As shown in FIG. 8A, illustratively, the shape must rotate clockwise from a vertical position, shown at the upper far left corner, at zero TSR, to a horizontal orientation at a TSR of 6 at the far upper right corner. The normal component of the lift force steadily rises as the tip speed ratio (TSR) increases, but the tangential component, which is illustratively an order of magnitude smaller, goes steadily to zero when the TSR equals the L/D ratio. The power output of the tangential portion has a peak at approximately half the maximum TSR, which then declines as the TSR increases, while the power output of the normal portion, if harvested, always increases with TSR. Similarly, torque on the blades, which is the tangential component, decreases with TSR and goes to zero at approximately TSR=L/D.

Figure 8B:
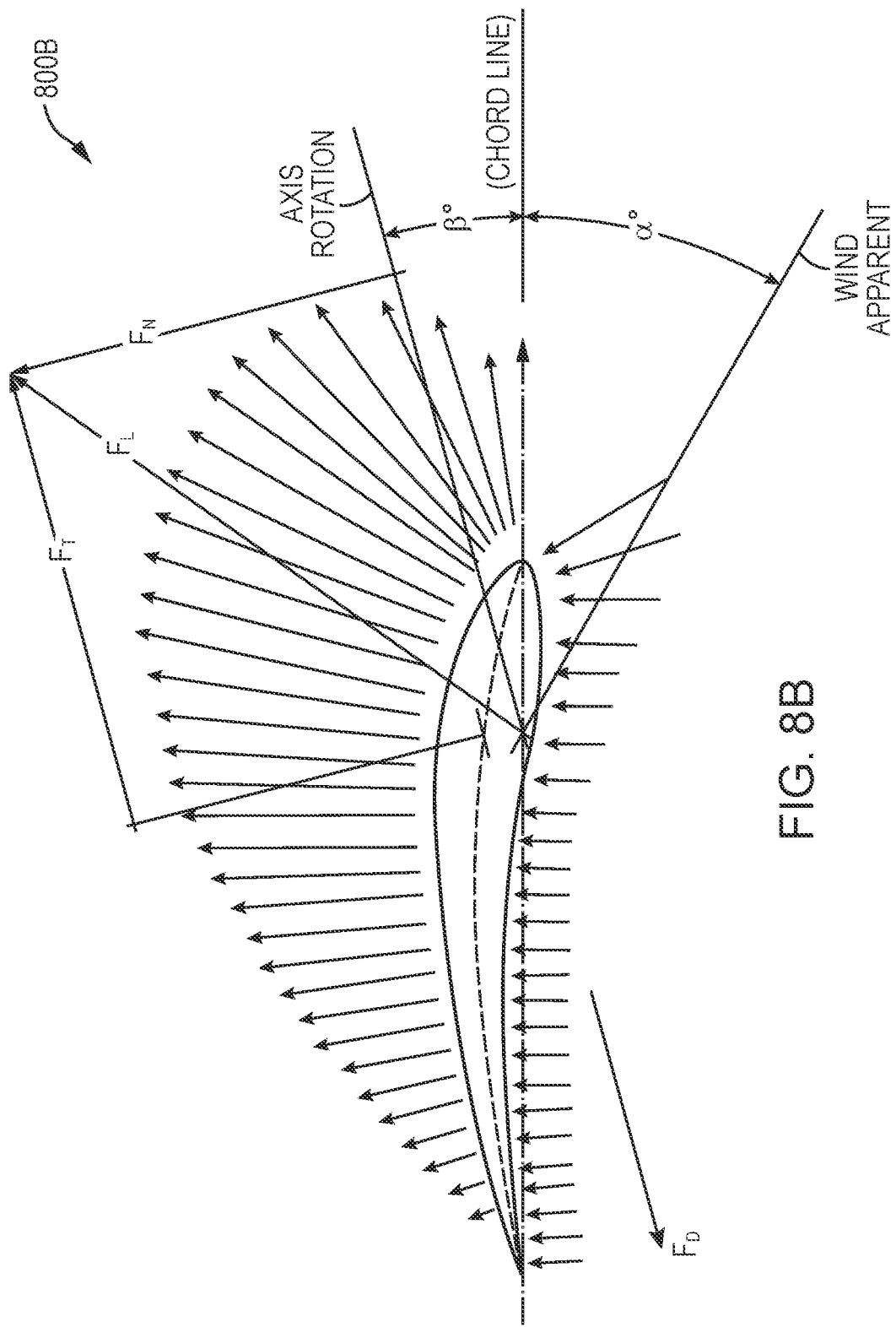
FIG. 8B is an illustration of an exemplary lift force blade's pressure distribution in accordance with an illustrative embodiment of the present invention.

FIG. 8B is a diagram illustrating the asymmetrical nature of the lift forces on a blade detailing its tangential and normal components in accordance with an illustrative embodiment of the present invention. If the Tangential Lift forces are greater than the opposing Drag Forces in the direction of desired/tracked motion, the object/machine will perpetually move accordingly.

Figure 9A:
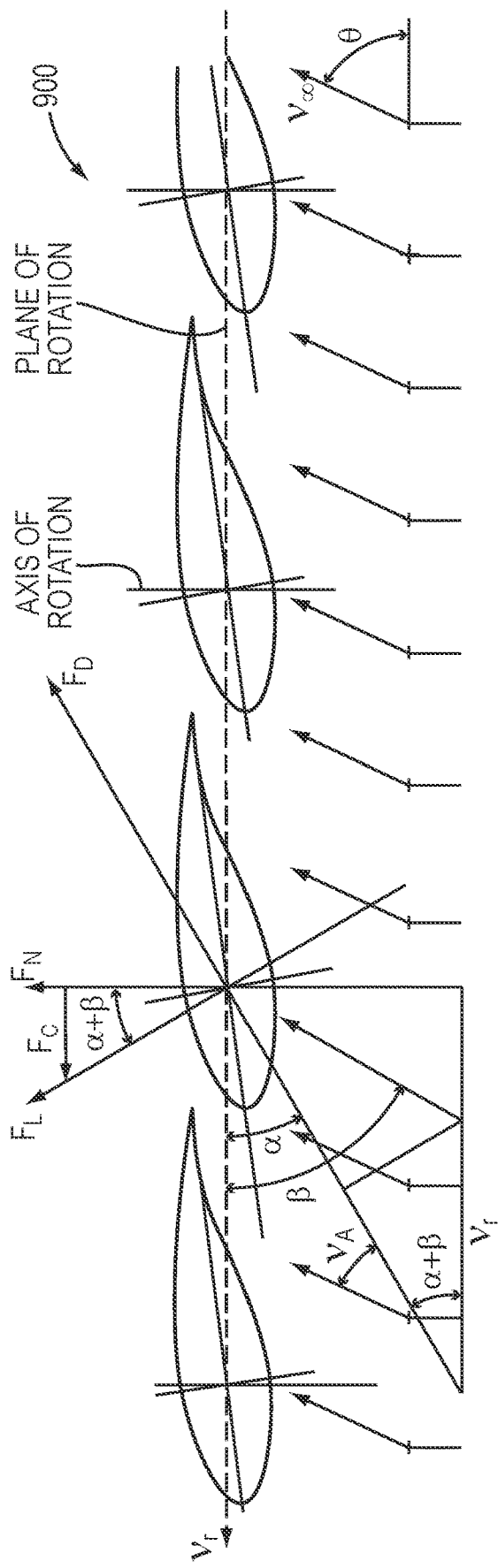
FIG. 9A is an exemplary diagram illustrating blade layout in accordance with an illustrative embodiment of the present invention.

FIG. 9A is an exemplary blade layout used on both the HALT and the open cycle lift force turbine, showing exemplary blade positions and orientations of various components. The blades do not necessarily have to overlap, but their flows do, as the flow from the trailing edge of one works to energize the boundary layer of its succeeding blade, at the very area where it is most likely to separate at high angles of attack, allowing it to function at these higher attack angles. Conventional wisdom would, and does, indicate that in order for this circular blade array to exhibit a normal lift forcer in the observed direction, downstream of the oncoming flow, that the resultant downdraft would/must reverse back upon itself, which is a clear absurdity.

Figure 9B:
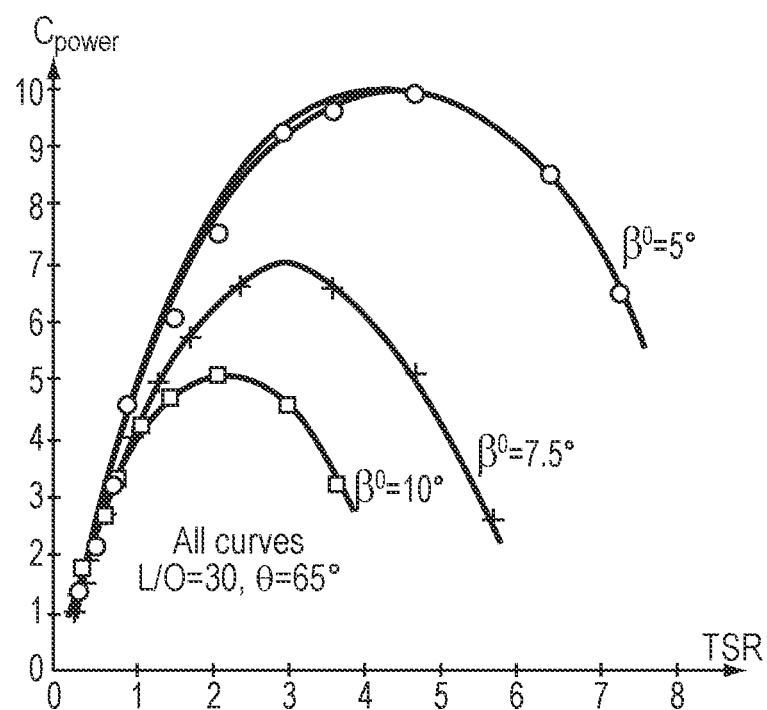
FIG. 9B is an exemplary chart illustrating the relationship between TSR and power in accordance with an illustrative embodiment of the present invention.

FIG. 9B is a graph of the influences on the various angles involved in the blade layout to the Coefficient of Power, ($C_{power}$) for both the HALT and the open cycle lift force turbine blade layout in accordance with an illustrative embodiment of the present invention.

Figure 10B:
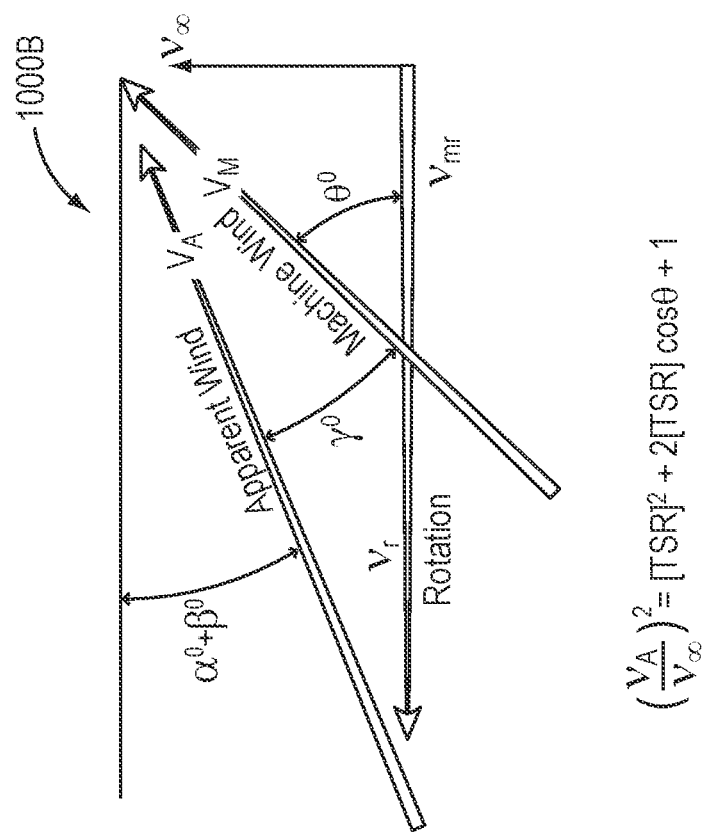
FIG. 10B is an exemplary force diagram of a lift turbine blade in accordance with an illustrative embodiment of the present invention.
Figure 10A:
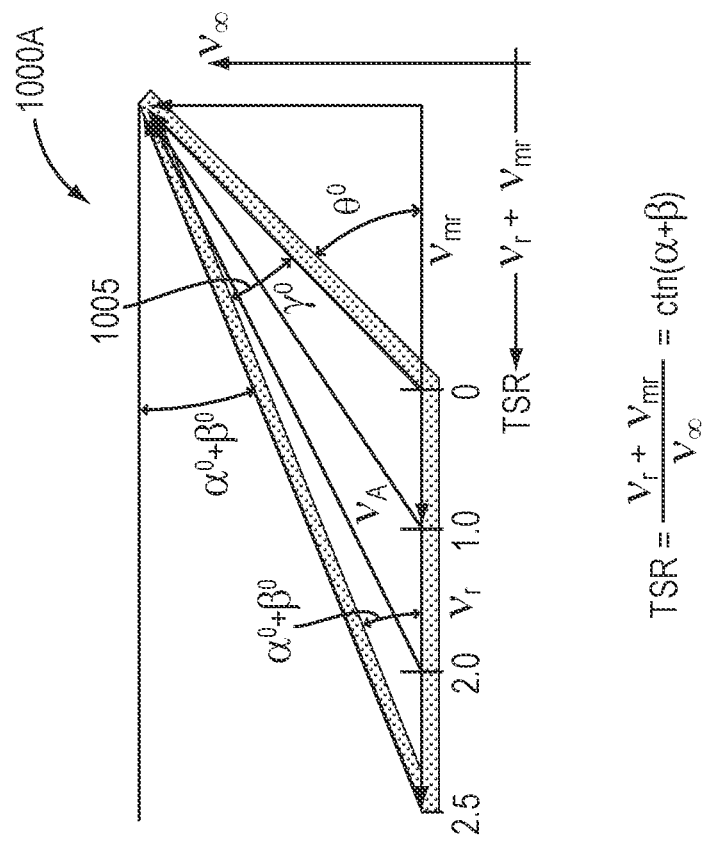
FIG. 10A is an exemplary force diagram for a golden triangle and compression of alpha ($\alpha$) the angle of attack, in accordance with an illustrative embodiment of the present invention.

FIG. 10A is a diagram illustrating an exemplary Golden triangle showing the compressed range of the attack angle alpha ($\propto$) in accordance with an illustrative embodiment of the present invention.

FIG. 10B is a diagram illustrating how the apparent wind is enhanced by the redirected machine wind when used with a blade as described herein in accordance with an illustrative embodiment of the present invention.

Figure 11:
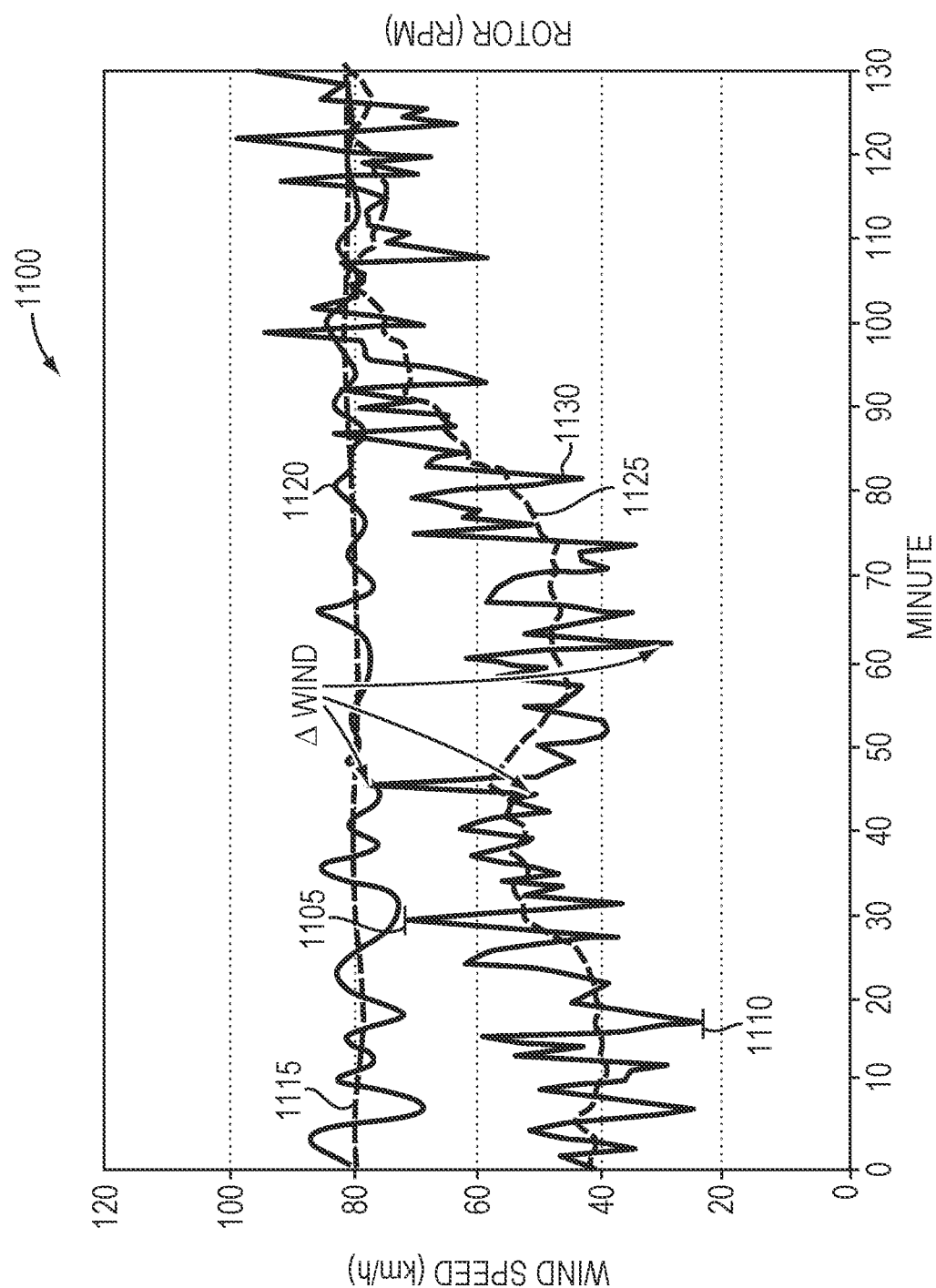
FIG. 11 is a chart illustrating momentary spikes and lulls in wind speed in accordance with an illustrative embodiment of the present invention.

FIG. 11 is a chart 1100 illustrating changes in rotor speed verses micro wind. The line 1115 represents a typical older three bladed conventions turbine, line 1120 near it represents a more modern version. The lower curves are that of an open cycle lift force turbine or HALT in accordance with an illustrative embodiment of the present invention. Illustratively, the x-axis is linear time, while the y-axis is a wind speed in kilometers per hour (km/h). The lower chart illustrates wind speeds for both machines measured at fractional minute intervals (solid line) 1130 while the dotted line 1125 around it represents the HALT mean machine rotor speed (dashed line). Momentary spikes, such as exemplary spike 1105, may invoke blade stall and lulls, such as exemplary lull 1110, may invoke a blade back wind event in both machines. These changes, in the momentary wind, aka A Winds may put a conventional wind turbine into a momentary stall or cause a windmill or turbine to stop. The recovery of such a stall or stop may take on the order of one or more seconds. By the time such a recovery has occurred, a new micro wind event (e.g., spike or lull) may have occurred, which may result in further stalls, preventing the rotor from ever getting up to speed, causing a significant reduction in captured power. As can be readily seen, the HALT follows more closely the actual micro wind speed. Conventional wisdom theory would say that this full blade array cannot work and would ascribe this non-functioning to be due to the full array overlapping blade layout blocking the blade's "downdraft;" however direct empirical observation and power measurements of the tangential lift force output of the HALT clearly disputes this notion.

The principles of the present invention may be utilized to overcome such problems with micro wind events. By counter pre-rotating and properly orientating the flow of the wind (or other fluid) prior to impacting with the rotating blades, the maximum possible excursions of the wind attack angle upon the blades is compressed, preventing momentary lulls in the speed of the fluid to negatively affect the rotation of the turbine, e.g., a HALT or open cycle lift force turbine in various exemplary embodiments of the present invention works smoothly, despite always present local wind turbulences.

Chart 1100 also illustrates an exemplary rotor revolutions per minute of an exemplary turbine. Illustratively, the RPM of the rotor may have momentary changes 1120, but overall maintains a substantially constant rate.

Figure 12:
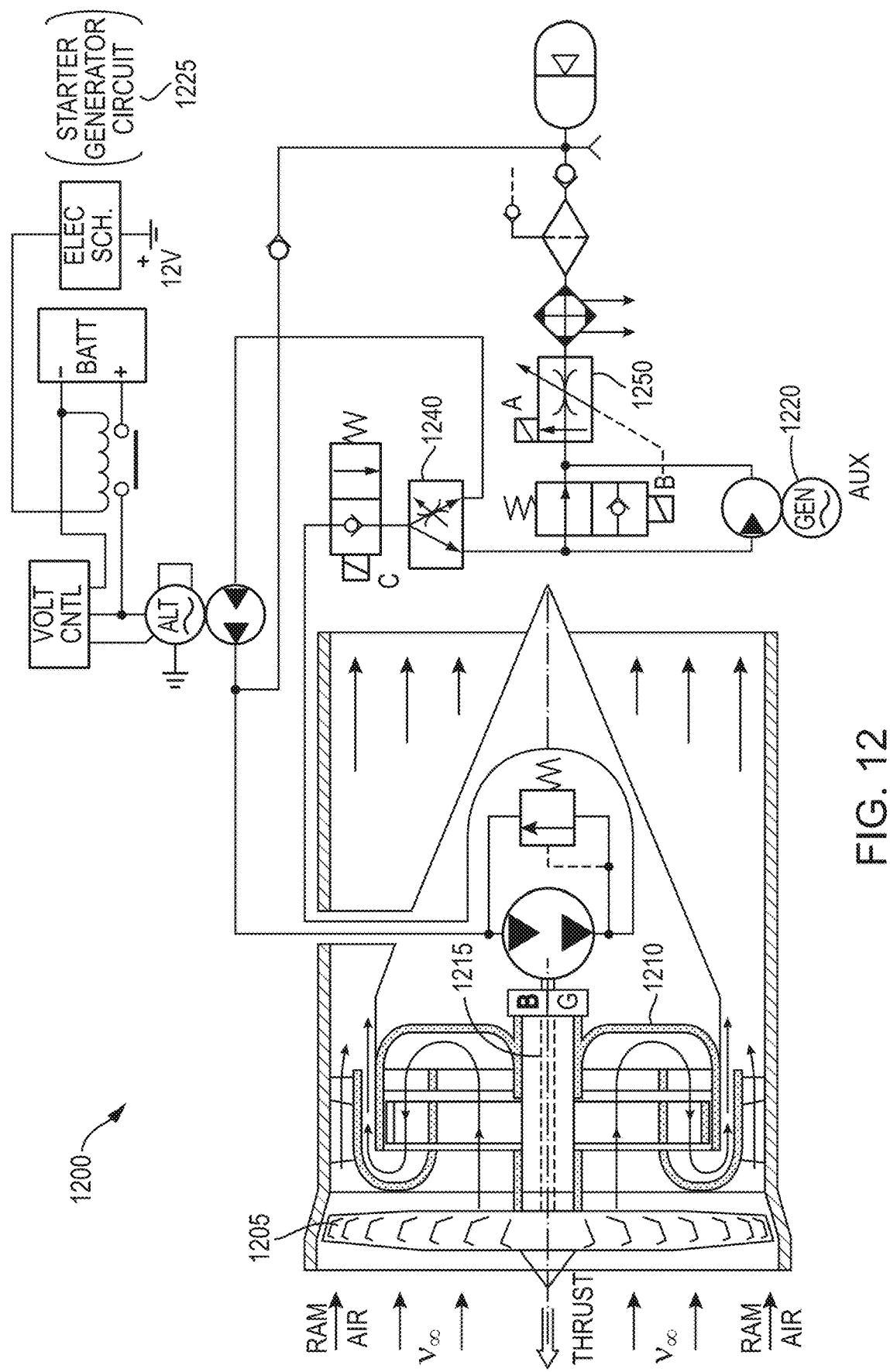
FIG. 12 is a view of an exemplary open cycle lift force turbine in accordance with an illustrative embodiment of the present invention.

FIG. 12 is schematic type representation or view of an exemplary open cycle lift force turbine 1200 with an exemplary hydraulic control and auxiliary energy harvesting circuit in accordance with an illustrative embodiment of the present invention. It uses the Ram Air from the vehicle's forward movement aided by a slower speed gear driven front By-Pass Fan 1205 to provide working fluid flow to the high-speed reverse flow Lift Turbine 1210 at its heart. Unlike a jet engine and its power turbine, this specific arrangement importantly aligns the thrust forces of the Fan 1205 and the Lift Turbine 1210. The Lift Turbine, through a gear train 1215, after starting up, drives the By-Pass Fan 1205, the on-board battery recharger starter-generator 1220 as well as the hydraulic control mechanism including needle valves 1240 and 1250 and other accessories, similar to the power turbine on a jet engine. In my Lift Force Turbine, Lift Forces essentially and actually replace the expansion effects of heat. As it is not a heat engine, its actions are not governed by the well-known Laws of Thermodynamics. It is started up by an on-board battery powered electric starter generator 1225, which also provides power during vehicle taxiing, take off, landing and/or hovering activities. Mounted within a suitable low Drag high Lift vehicle, e.g., an airplane, it will continue to have this resultant Lift Force in the forward direction, much like a suitable wing having low pressure Lift Force above its wing as long as it is traveling relative to the air, this machine will to continue its travel in a forward direction until something breaks down, i.e. perpetually as long as the total Lift forces are greater than the total Drag forces in the direction of motion.

Figure 13:
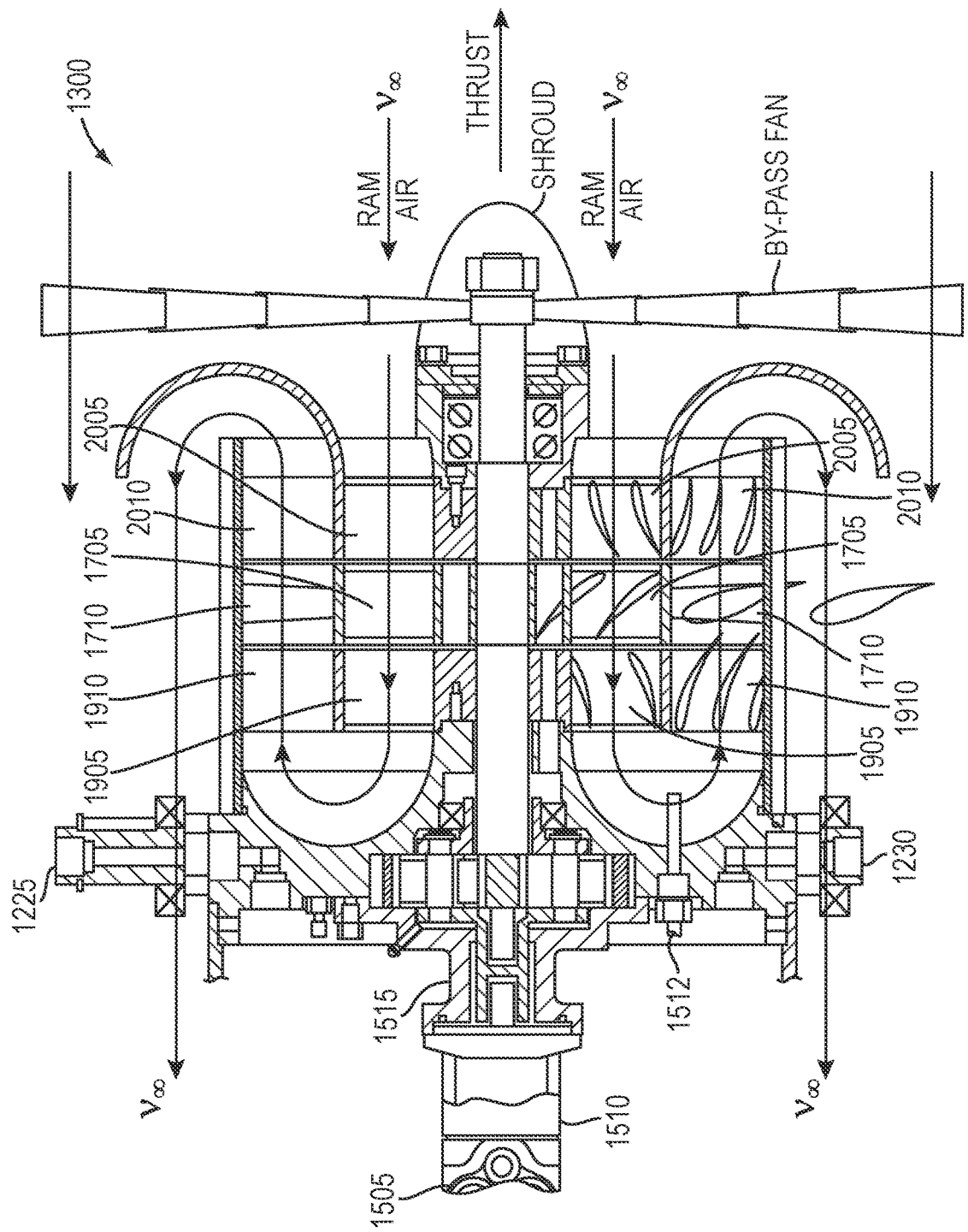
FIG. 13 is a perspective view of an exemplary open cycle lift force turbine in accordance with an illustrative embodiment of the present invention.

FIG. 13 is a view 1300 of an exemplary open cycle lift force turbine in accordance with an illustrative embodiment of the present invention. This is functionally identical to FIG. 12 and illustrates the design transition from a closed cycle machine described in the above-incorporated U.S. patent application Ser. No. 17/186,739, which was filed on Feb. 26, 2021, by Orville J. Birkestrand for TOROIDAL LIFT FORCE ENGINE.

Figure 14:
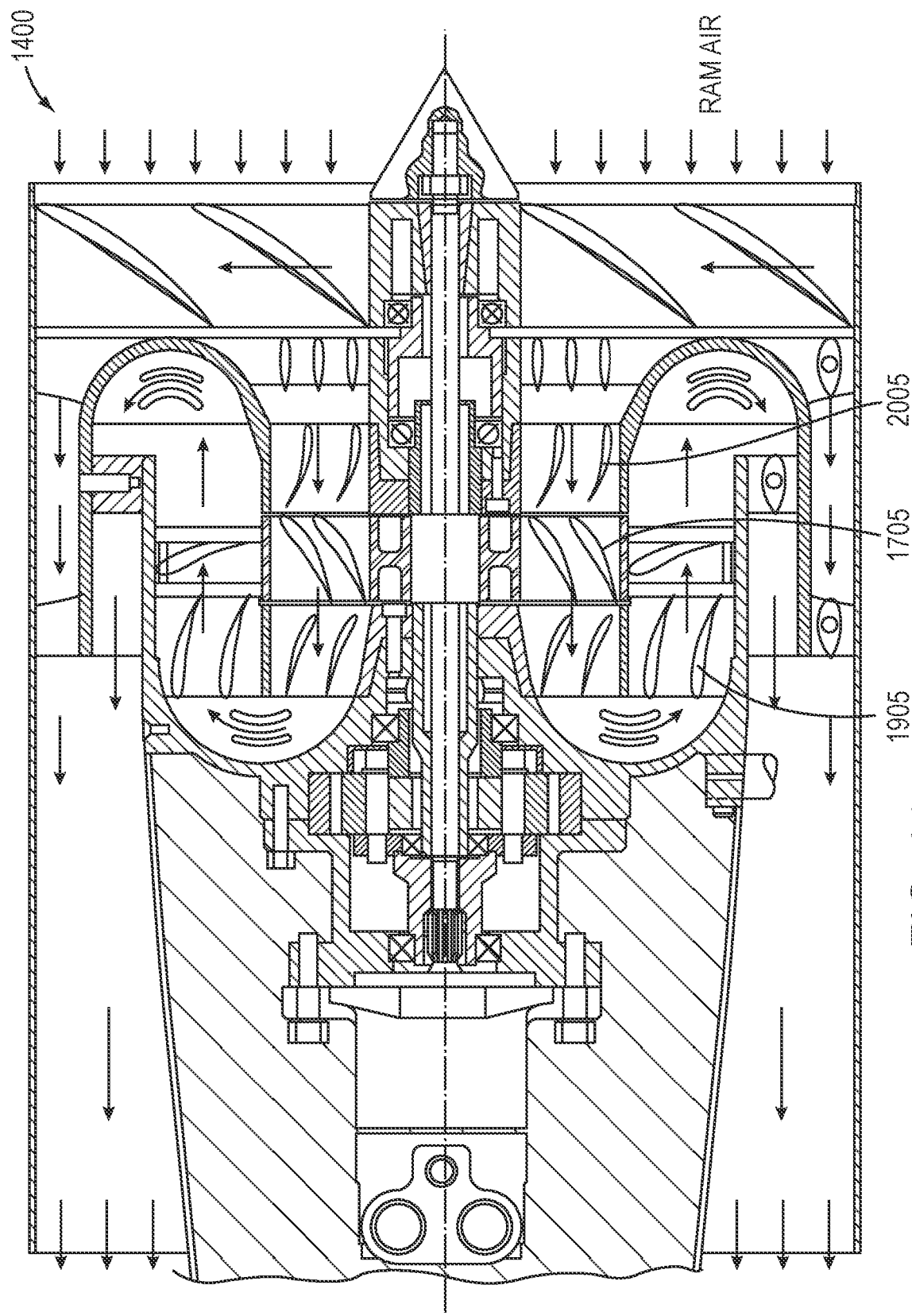
FIG. 14 is a perspective view of an exemplary open cycle lift force turbine in accordance with an illustrative embodiment of the present invention.

FIG. 14 is a semi scale two-dimensional conventional drawing of actual components, or a view 1300 of an exemplary open cycle lift force turbine in accordance with an illustrative embodiment of the present invention. Functionally it is identical to FIG. 12.

Figure 15:
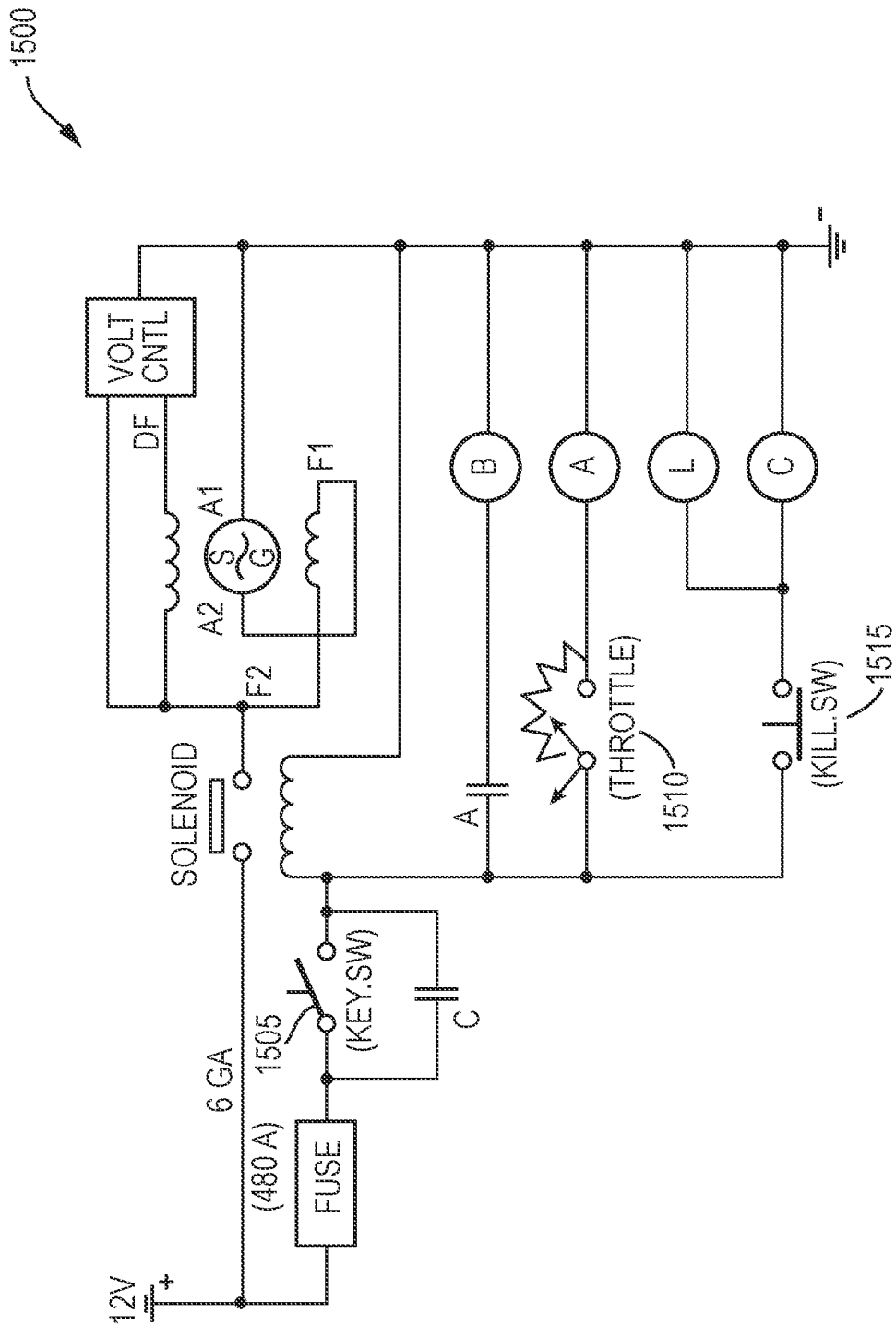
FIG. 15 is a diagram of an exemplary electrical system for use with an open cycle lift force turbine in accordance with an illustrative embodiment of the present invention.

FIG. 15 is a schematic ladder type electrical circuit diagram of an exemplary power circuit 1500 in accordance with an illustrative embodiment of the present invention. Circuit 150 includes a key switch 1505, a throttle 1510, kill switch 1515 in a purposely simple control circuit that is totally unaffected by bothersome internet interference hazards.

FIG. 16A is a straight on view 1600A of exemplary blades of a lift turbine 1710 and axial flow turbine 1705 in accordance with an illustrative embodiment of the present invention.

FIG. 16B is a cross-sectional view 1600B of the blades of an exemplary open cycle lift force turbine 1200 in accordance with an illustrative embodiment of the present invention. Similar to FIG. 17A, lift turbine blades 1710 are shown as well as the axial flow blades 1705. Flow 1715 and flow 1720 are shown to indicate the direction of the fluid flow within the assembly. The mean velocity of flow 1720 is approximately twice the mean velocity of flow 1715 because of the change in housing geometry.

Figure 17:
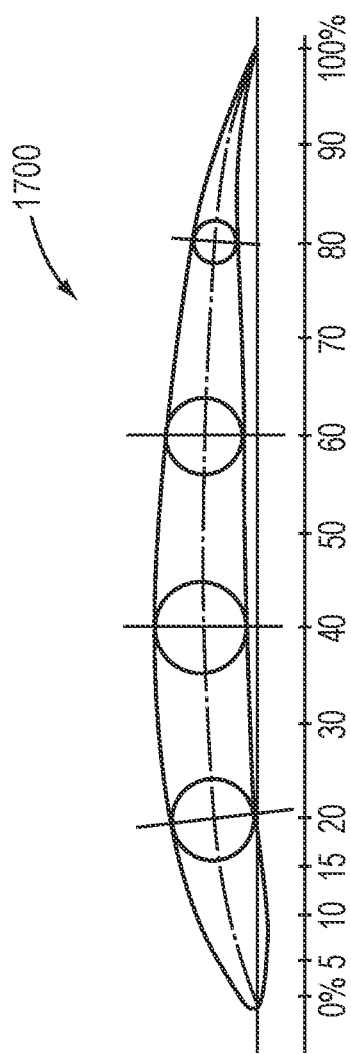
FIG. 17 is a cross-sectional diagram of an exemplary blade for use with the input/exit stators as well as the axial flow turbine of an open cycle lift force turbine in accordance with an illustrative embodiment of the present invention.

FIG. 17 is a cross-sectional view 1700 of an exemplary blade of an open cycle lift force turbine in accordance with an illustrative embodiment of the present invention. Exemplary blade 1800 shows an illustrative cross-section for all blades utilized within the open cycle lift force turbine except for the lift turbine itself.

Figure 18B:
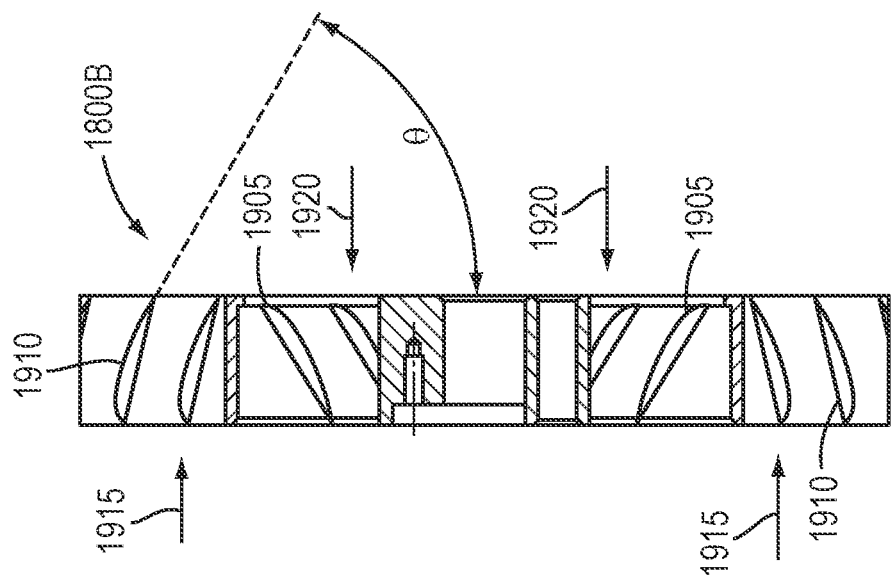
FIG. 18B is a cross-sectional view of blades for an input stator, showing θ° angle, in accordance with an illustrative embodiment of the present invention.
Figure 18A:
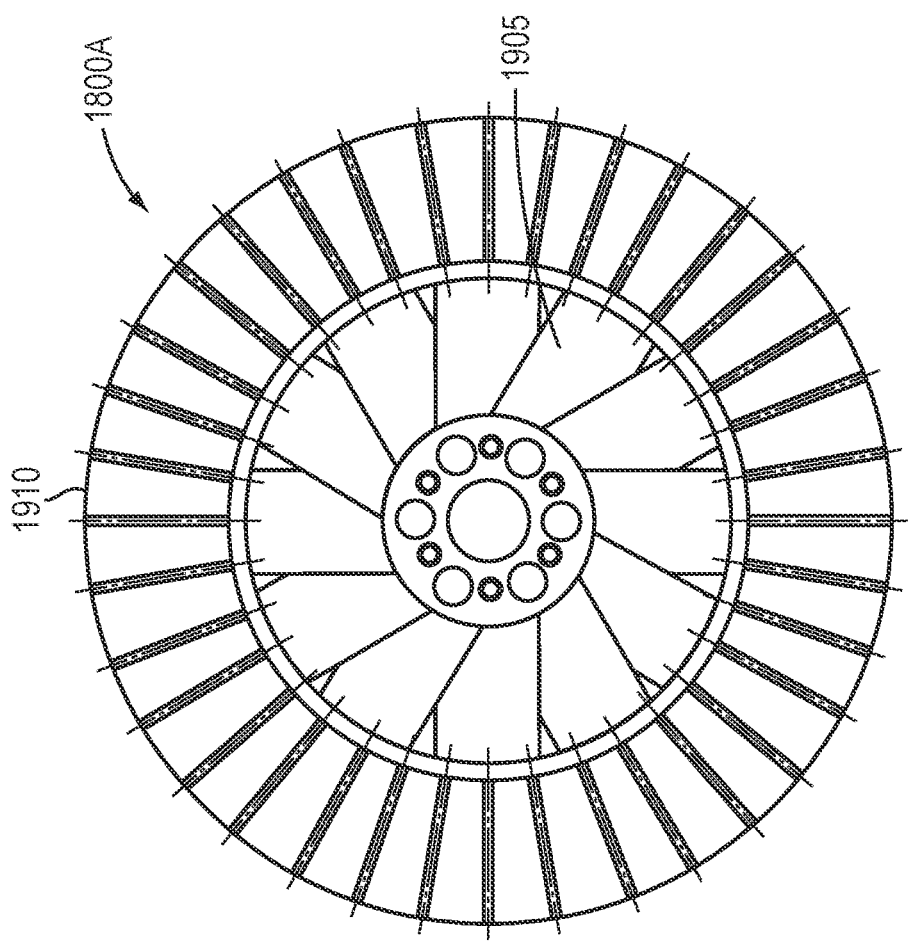
FIG. 18A is a forward view of blades for an input stator to the lift turbine and exit stator to the axial compressor turbine in accordance with an illustrative embodiment of the present invention.
Figure 19B:
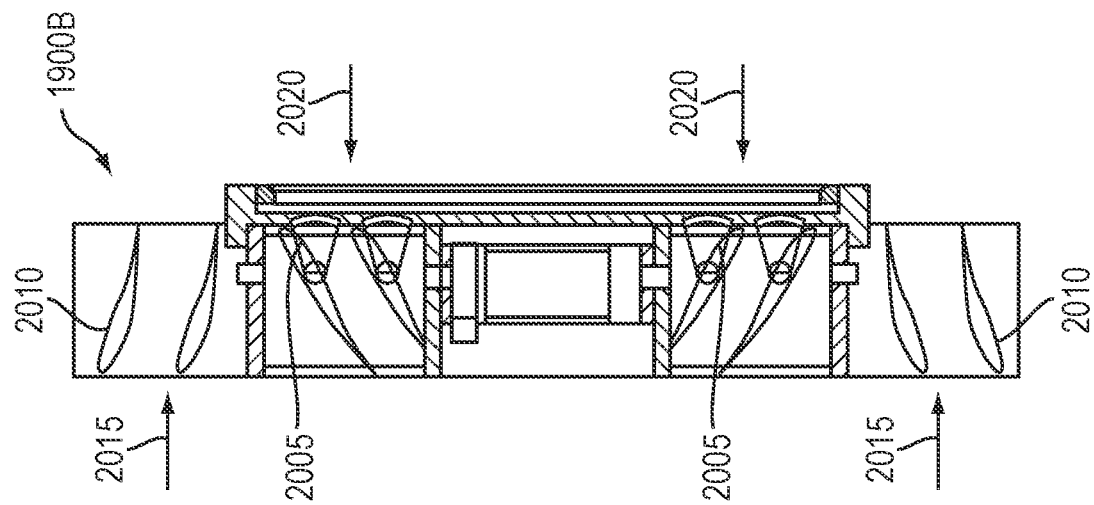
FIG. 19B is a cross-sectional view of exemplary blades for an exit stator in accordance with an illustrative embodiment of the present invention.

FIG. 18A is a straight on view 1800A of exemplary blades of turbine lift intake stator 1910 and in accordance with an illustrative embodiment of the present invention. Exemplary blade 1910 with flow exiting at angle θ, shown below in reference to FIG. 19B, is utilized by the stator to pre-rotated the flow. Specifically, the flow is preloaded rotated to maximize the desired effect of a particular angle of attack as the fluid enters the lift turbine. Blades 1905 are utilized to straighten out the flow to minimize flow loses as it comes out of the axial flow turbine 1705 prior to entering the lift turbine input stator 1910 again. Illustratively, blades of the input stator 1900 are stationary utilized to passively rotate and/or straighten out the flow as the fluid of the toroidal engine passes through.

FIG. 18B is a side view 1800B of exemplary blades of an input stator 1900 showing angle θ in accordance with an illustrative embodiment of the present invention. Flows 1915, 1920 are shown to indicate the direction of flow of the fluid in accordance with an illustrative embodiment of the present invention.

Figure 19A:
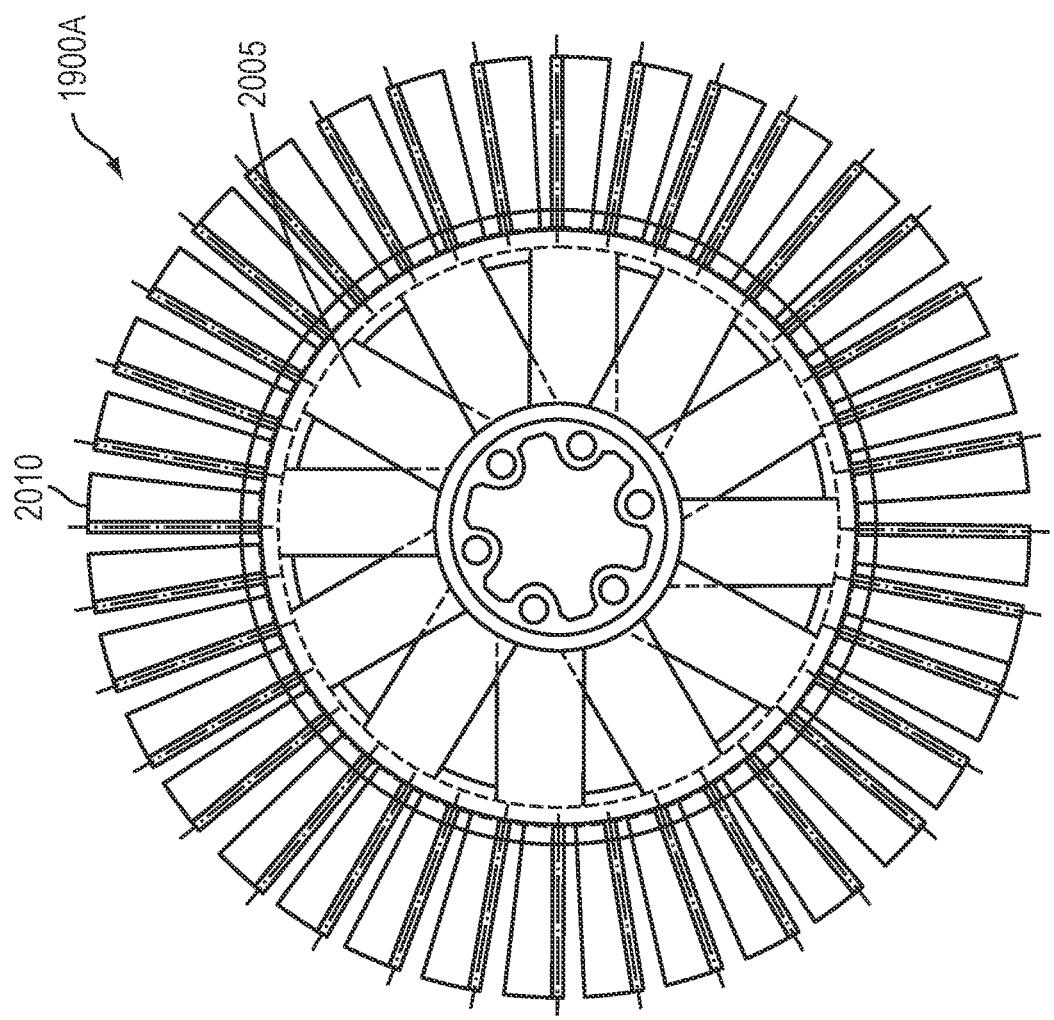
FIG. 19A is a forward view of exemplary blades for an exit stator, and adjustable axial blades in accordance with an illustrative embodiment of the present invention.

FIG. 19A is a side view 1900A of a cross-sectional view of exemplary blades of an exit stator 2010 in accordance with an illustrative body of the present invention. Exemplary exit stator 2000 includes a set of blades 2010 are utilized to straighten the flow 2015 of the fluid as it exits the lift turbine. Exemplary blades 2010 are not adjustable and do not rotate. Exemplary blades 1905 are optionally adjustable and are utilized to adjust the angle of attack of the fluid as it enters the axial flow turbine, 1705.

FIG. 19B is a straight on view 1900B of exemplary blades in accordance with an illustrative embodiment of the present invention. As described above in relation to FIG. 19A, exemplary blades 2010 remain stationary and are fixed. Blades 2010 straighten the flow 2015 as it exits the lift turbine to minimize flow loses. Blades 1905 remain stationary but may be optionally adjusted to modify the angle of attack for the flow 2020 as it passes through the axial flow turbine blades, 1705.

Figure 19C:
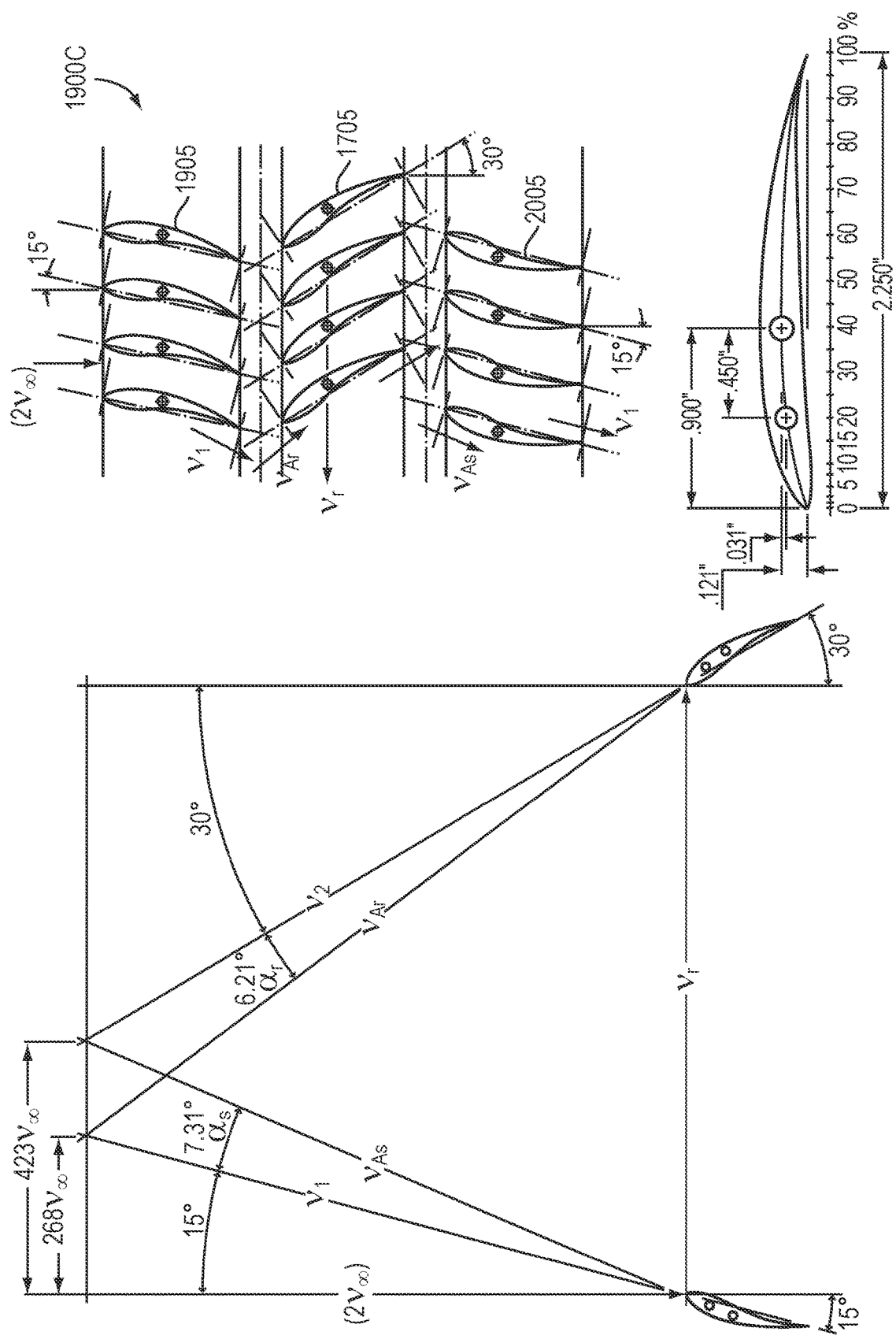
FIG. 19C is a cross-sectional view of the blade velocity diagram of a open cycle lift force turbine's axial flow turbine with its input and output stators in accordance with an illustrative embodiment of the present invention.

FIG. 19C is a cross-sectional view 1900C of the blade velocity diagram of an open cycle lift force turbine's axial flow turbine with its input and output stators in accordance with an illustrative embodiment of the present invention.

Figure 19D:
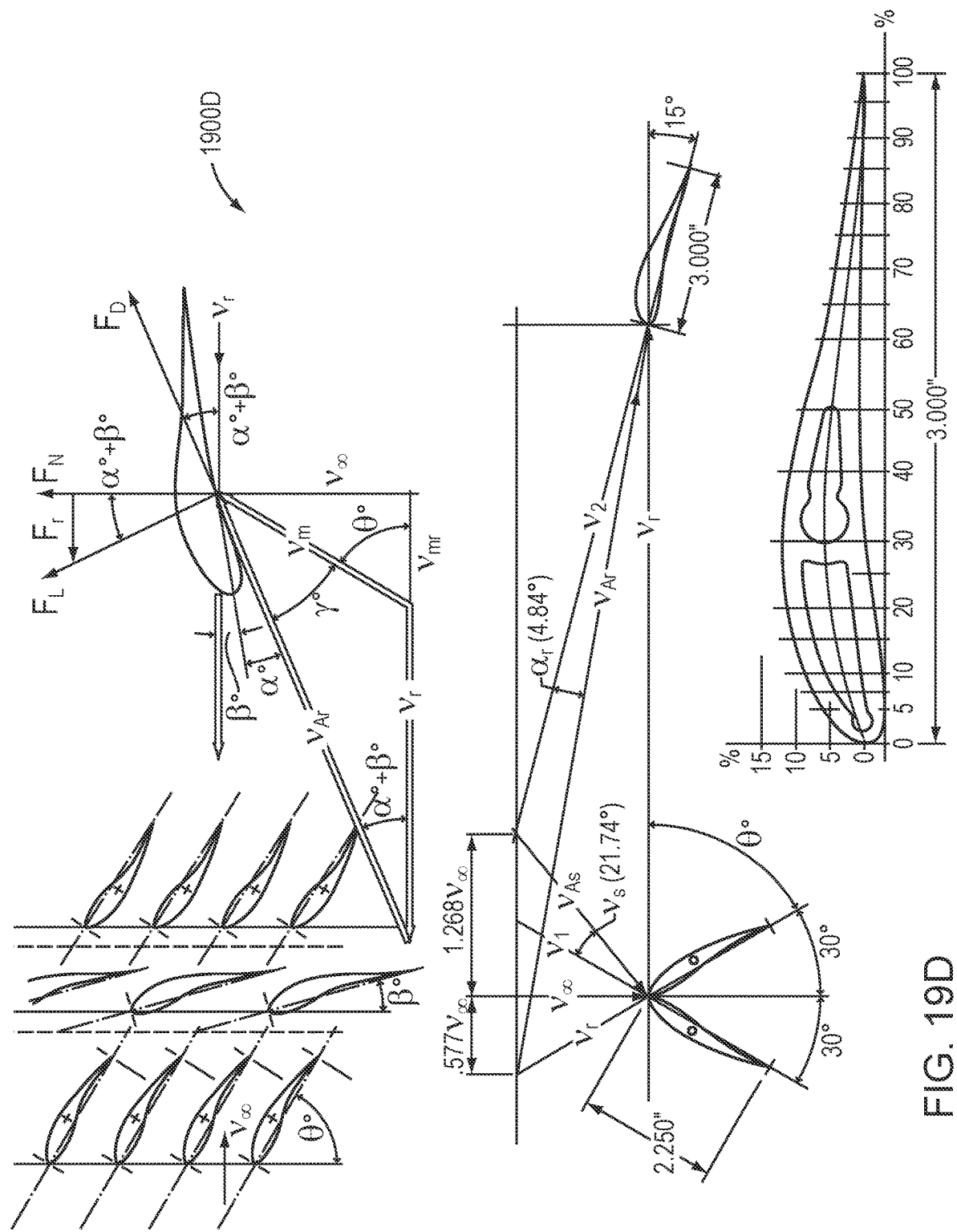
FIG. 19D is a cross-sectional view of the blade velocity diagram of the open cycle lift force turbine's lift force turbine with its input and output stators showing its rotation into the flow of the working fluid, differing from conventional gas turbines and steam engines in accordance with an illustrative embodiment of the present invention.

FIG. 19D is a cross-sectional view 1900D of the blade velocity diagram of the open cycle lift force turbine's lift force turbine with its input and output stators showing its rotation into the flow of the working fluid, differing from conventional gas turbines and steam engines in accordance with an illustrative embodiment of the present invention.

FIG. 20 is a view 2000 of an exemplary aircraft 2005 that utilizes an open cycle lift force turbine in accordance with an illustrative embodiment of the present invention. The open cycle lift force turbine 2010 is illustratively mounted on wings similar to a conventional jet engine.

Figure 21:
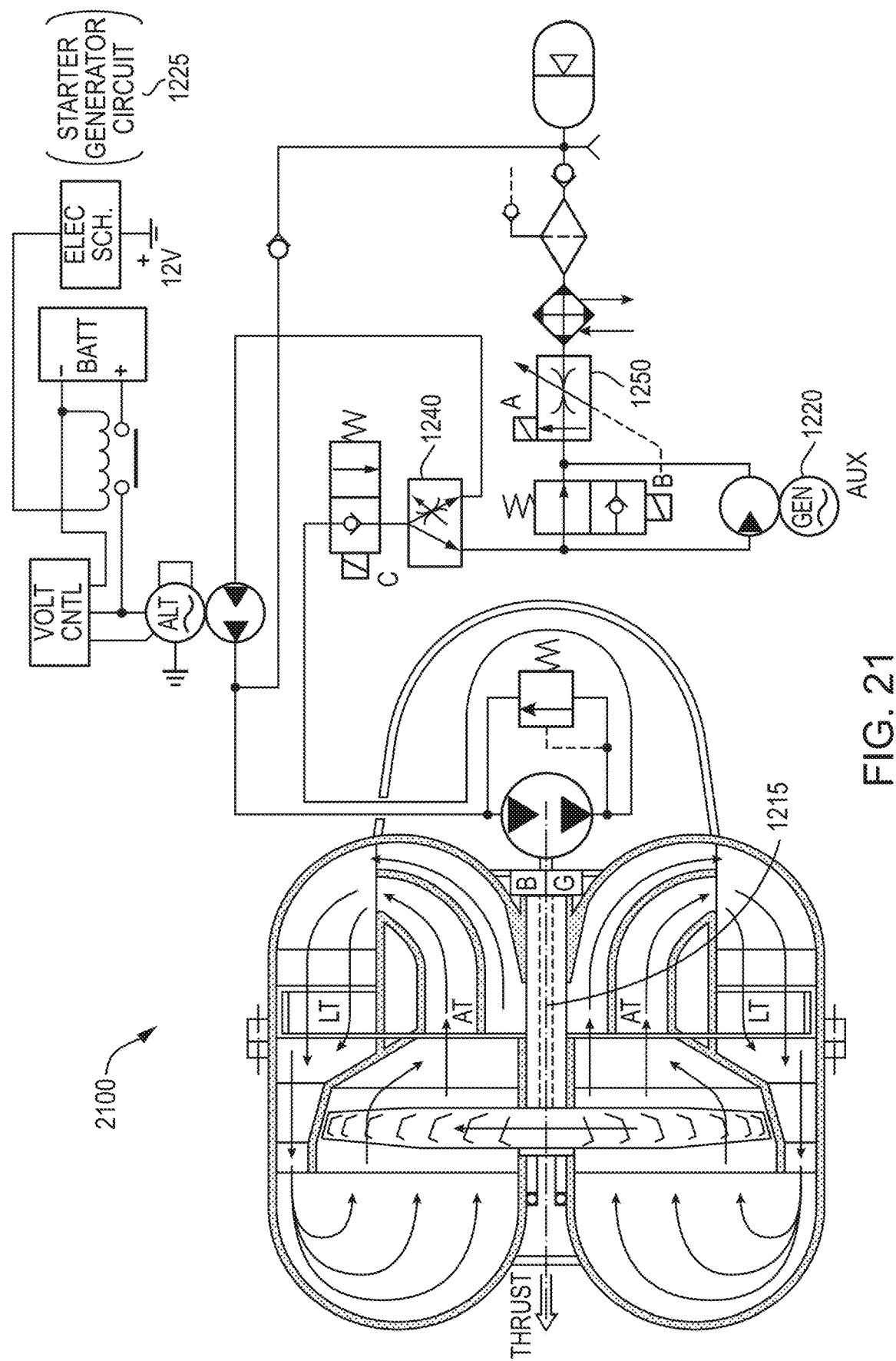
FIG. 21 is a view of an exemplary closed cycle lift force turbine in accordance with an illustrative embodiment of the present invention.

FIG. 21 is a view of 2100 of an exemplary closed cycle version of the above closed cycle turbine with the Lift Turbine exit flow exited forward to the front of the By-Pass Fan and recirculated, showing an optional centrifugal turbine in lieu of the Axial Flow Turbine and its exit stator. It can be pressurized to a hundred atmospheres or more and is independent of its vehicle's speed and/or local atmosphere, but otherwise is identical to the Open Cycle version described above.

The above description has been written in terms of various exemplary embodiments. Therefore, it is intended that all matter contained in the above description or shown in the accompanying drawings should be interpreted as illustrative and not in a limiting sense. Specifically, it should be noted that each various sizes, degrees of overlap, materials, number of blades, etc. should be viewed as exemplary and not limiting the scope of the present invention. As will be appreciated by those skilled in the art, the principles of the present invention may be utilized with a variety of materials, sizes, and/or objectives.

It should be noted that while various descriptions and arrangement of components have been described herein providing electricity, heat, hot water, and/or air conditioning, the principles of the present invention may be utilized in a wide variety of systems. The present invention is primarily designed to replace conventional aircraft jet engines. As such, the description of particular arrangements of components should be taken as exemplary only. It should be expressly noted that in alternative embodiments, a halt system may be configured to provide only hot water, electricity, or heat, or any combination thereof. As will be appreciated by those skilled in the art, the principles of the present invention for the description contained herein may have unnecessary components removed in order to meet the desired objectives of a particular installation.

What is claimed is:

1. An apparatus comprising:
  an open cycle lift turbine assembly operatively interconnected with an axial flow turbine assembly, the lift turbine assembly and the axial flow turbine assembly being housed within a container filled with a flow through gas;
  the lift turbine assembly including,
    (a) a bypass fan;
    (b) an input stator having a first set of blades, the first set of blades causing a counter rotation flow in the gas;
    (c) a lift turbine having a second set of blades, the second set of blades generating lift force, the second set of blades rotating into the counter rotation flow of the gas; and
  the axial flow turbine assembly including:
    (a) an axial flow input stator having a third set of blades;
    (b) an axial flow turbine having a fourth set of blades, the fourth set of blades rotating into the counter rotation flow.

2. The apparatus of claim 1 wherein the apparatus is electrically driven to start spinning of the sets of blades to provide thrust and power in an atmosphere while the sets of blades remain spinning without burning a fuel in the apparatus.

3. The apparatus of claim 1 wherein rotation of the lift turbine operates a pump.

4. The apparatus of claim 2 wherein the pump drives hydraulic fluid, the hydraulic fluid operating a machine.

5. The apparatus of claim 4 wherein the machine is a heat exchanger.

6. The apparatus of claim 4 wherein the machine is an electric generator.

7. The apparatus of claim 4 wherein the machine is a needle valve.

8. The apparatus of claim 1 wherein the needle valve is configured to control and regulate a speed of the lift turbine relative to a speed of the gas flow.

9. The apparatus of claim 4 wherein the machine is a pressurized accumulator.

10. The apparatus of claim 1 wherein components of the apparatus are configured and arranged such that a thrust force is independent of the chemical components of the flow through gas.

11. The apparatus of claim 1 wherein components of the apparatus are configured and arranged such that the gas remains at a substantially steady pressure throughout the apparatus.

12. The apparatus of claim 1 wherein the overall container is substantially tubular in shape.

13. The apparatus of claim 10 wherein the chemical components of the flow through gas consists of helium.

14. The apparatus of claim 1 wherein the open cycle lift turbine assembly is configured and arranged such that the flow through gas remains at a substantially steady temperature.

15. The apparatus of claim 1 wherein the lift turbine and the axial flow turbine rotate as a single unit.

16. The apparatus of claim 1 wherein the fourth set of blades are adjustable.

17. The apparatus of claim 1 wherein a normal component of the generated lift force of one or more of the sets of blades is used to generate thrust.

18. The apparatus of claim 1 wherein a portion of a tangential lift force of one or more of the sets of blades provides thrust.

19. The apparatus of claim 1 further comprising a pressure compensated needle valve operatively interconnected with the lift turbine assembly, wherein adjusting of the needle valve causes the lift turbine to vary in speed and an amount of generated thrust to vary increase accordingly.

20. The apparatus of claim 19 wherein closing the pressure compensated needle valve causes the amount of generated thrust to decrease.

21. The apparatus of claim 1 wherein a lift to drag ratio (L/D) of the lift turbine is greater than 1:1.

22. The apparatus of claim 21 wherein the L/D is approximately 150:1.

23. The apparatus of claim 1 wherein the By-Pass Fan also provides thrust.

24. The apparatus of claim 1 wherein the axial flow turbine also provides thrust.

* * * * *